United States Patent
Yaguchi

(10) Patent No.: US 11,211,620 B2
(45) Date of Patent: Dec. 28, 2021

(54) FUEL CELL SYSTEM WITH ANODE DEGRADATION REDUCTION CONTROL

(71) Applicant: NISSAN MOTOR CO., LTD., Yokohama (JP)

(72) Inventor: Tatsuya Yaguchi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 551 days.

(21) Appl. No.: 16/063,888

(22) PCT Filed: Nov. 14, 2016

(86) PCT No.: PCT/JP2016/083704
§ 371 (c)(1),
(2) Date: Jun. 19, 2018

(87) PCT Pub. No.: WO2017/110303
PCT Pub. Date: Jun. 29, 2017

(65) Prior Publication Data
US 2018/0375129 A1    Dec. 27, 2018

(30) Foreign Application Priority Data
Dec. 25, 2015 (JP) ............................ JP2015-254211

(51) Int. Cl.
*H01M 8/04303* (2016.01)
*H01M 8/04228* (2016.01)
(Continued)

(52) U.S. Cl.
CPC ... *H01M 8/04303* (2016.02); *H01M 8/04104* (2013.01); *H01M 8/04216* (2013.01);
(Continued)

(58) Field of Classification Search
None
See application file for complete search history.

(56) References Cited

U.S. PATENT DOCUMENTS

| 4,657,828 A | 4/1987 | Tajima |
|---|---|---|
| 6,620,535 B2 | 9/2003 | Mukerjee et al. |

(Continued)

FOREIGN PATENT DOCUMENTS

| CN | 101953010 B | 5/2014 |
|---|---|---|
| JP | 61-233976 A | 10/1986 |

(Continued)

OTHER PUBLICATIONS

JP2006066244A English Translation (Year: 2006).*

*Primary Examiner* — Lucas J. O'Donnell
(74) *Attorney, Agent, or Firm* — Foley & Lardner LLP

(57) ABSTRACT

A fuel cell system comprising: a fuel cell;
a combustor configured to combust a fuel and an oxidizing gas to supply a combustion gas to a cathode inlet of the fuel cell;
a combustion fuel supply device configured to supply a fuel to the combustor;
a combustion oxidizing gas supply device configured to supply an oxidizing gas to the combustor;
an anode-discharged-gas discharge passage configured to discharge an anode discharged gas from an anode outlet of the fuel cell;
a cathode-discharged-gas discharge passage configured to discharge a cathode discharged gas from a cathode outlet of the fuel cell; and
a controller configured to control a supply of the fuel to the combustor by the combustion fuel supply device and a supply of the oxidizing gas to the combustor by the combustion oxidizing gas supply device, wherein
the controller includes a post-stop-request combustor-supply control unit configured to execute the supply of
(Continued)

the fuel and the supply of the oxidizing gas to the combustor after a request for stopping the fuel cell system.

18 Claims, 18 Drawing Sheets

(51) Int. Cl.
| | |
|---|---|
| *H01M 8/12* | (2016.01) |
| *H01M 8/04302* | (2016.01) |
| *H01M 8/04089* | (2016.01) |
| *H01M 8/04701* | (2016.01) |
| *H01M 8/04955* | (2016.01) |
| *H01M 8/0438* | (2016.01) |
| *H01M 8/04746* | (2016.01) |
| *H01M 8/04082* | (2016.01) |
| *H01M 8/0432* | (2016.01) |
| *H01M 8/04537* | (2016.01) |
| *H01M 8/124* | (2016.01) |

(52) U.S. Cl.
CPC ... *H01M 8/04228* (2016.02); *H01M 8/04302* (2016.02); *H01M 8/04365* (2013.01); *H01M 8/04388* (2013.01); *H01M 8/04395* (2013.01); *H01M 8/04432* (2013.01); *H01M 8/04559* (2013.01); *H01M 8/04589* (2013.01); *H01M 8/04701* (2013.01); *H01M 8/04753* (2013.01); *H01M 8/04761* (2013.01); *H01M 8/04955* (2013.01); *H01M 8/12* (2013.01); *H01M 2008/1293* (2013.01)

(56) References Cited

U.S. PATENT DOCUMENTS

| | | | |
|---|---|---|---|
| 2002/0168555 A1* | 11/2002 | Mukerjee | H01M 8/04201 429/442 |
| 2006/0246332 A1* | 11/2006 | Higashi | H01M 8/241 429/432 |
| 2011/0189566 A1 | 8/2011 | Hatada | |
| 2013/0130140 A1* | 5/2013 | Kato | H01M 8/242 429/429 |

FOREIGN PATENT DOCUMENTS

| | | |
|---|---|---|
| JP | 2004-349093 A | 12/2004 |
| JP | 2006-66244 A | 3/2006 |
| JP | 2006-100153 A | 4/2006 |
| JP | 2010-20930 A | 1/2010 |
| JP | 2012-252945 A | 12/2012 |

* cited by examiner

FUEL CELL SYSTEM WITH ANODE DEGRADATION REDUCTION CONTROL

TECHNICAL FIELD

The present invention relates to a fuel cell system that includes a fuel cell configured to be provided with a fuel gas and an oxidizing gas to generate electric power, and a control method for the fuel cell system.

BACKGROUND ART

In a fuel cell system, when electric generation in a fuel cell is stopped by an off-operation of a key switch and similar operation by a driver and the like, a predetermined fuel cell stop process is performed from an aspect of, for example, preventing oxidative degradation of an anode pole. For example, U.S. Pat. No. 6,620,535B2 has disclosed a fuel cell system that includes what is called a solid oxide fuel cell, and in the fuel cell system, a reverse-bias voltage is applied to a fuel cell stack when the system is stopped to prevent oxidative degradation of an anode pole of a fuel cell.

SUMMARY OF INVENTION

The above-described prevention of the oxidative degradation of the anode pole is important in the fuel cell system. Therefore, an effective method for suppressing the oxidative degradation of the anode pole has been desired other than the above-described application of the reverse-bias voltage.

Accordingly, it is an object of the present invention to provide a fuel cell system configured to reduce oxidation of an anode pole in a fuel cell stop process, and a control method for the fuel cell system.

According to an aspect of the invention, a fuel cell system is provided. The fuel cell system includes a fuel cell, a combustor configured to combust a fuel and an oxidizing gas to supply a combustion gas to a cathode inlet of the fuel cell, a combustion fuel supply device configured to supply a fuel to the combustor, a combustion oxidizing gas supply device configured to supply an oxidizing gas to the combustor, an anode-discharged-gas discharge passage configured to discharge an anode discharged gas from an anode outlet of the fuel cell, a cathode-discharged-gas discharge passage configured to discharge a cathode discharged gas from a cathode outlet of the fuel cell, and a controller configured to control a supply of the fuel to the combustor by the combustion fuel supply device and a supply of the oxidizing gas to the combustor by the combustion oxidizing gas supply device. In the fuel cell system, the controller includes a post-stop-request combustor-supply control unit configured to execute the supply of the fuel and the supply of the oxidizing gas to the combustor after a request for stopping the fuel cell system.

DESCRIPTION OF EMBODIMENTS

The following describes the embodiments of the present invention with reference to the drawings or similar reference.

First Embodiment

Figure 1:
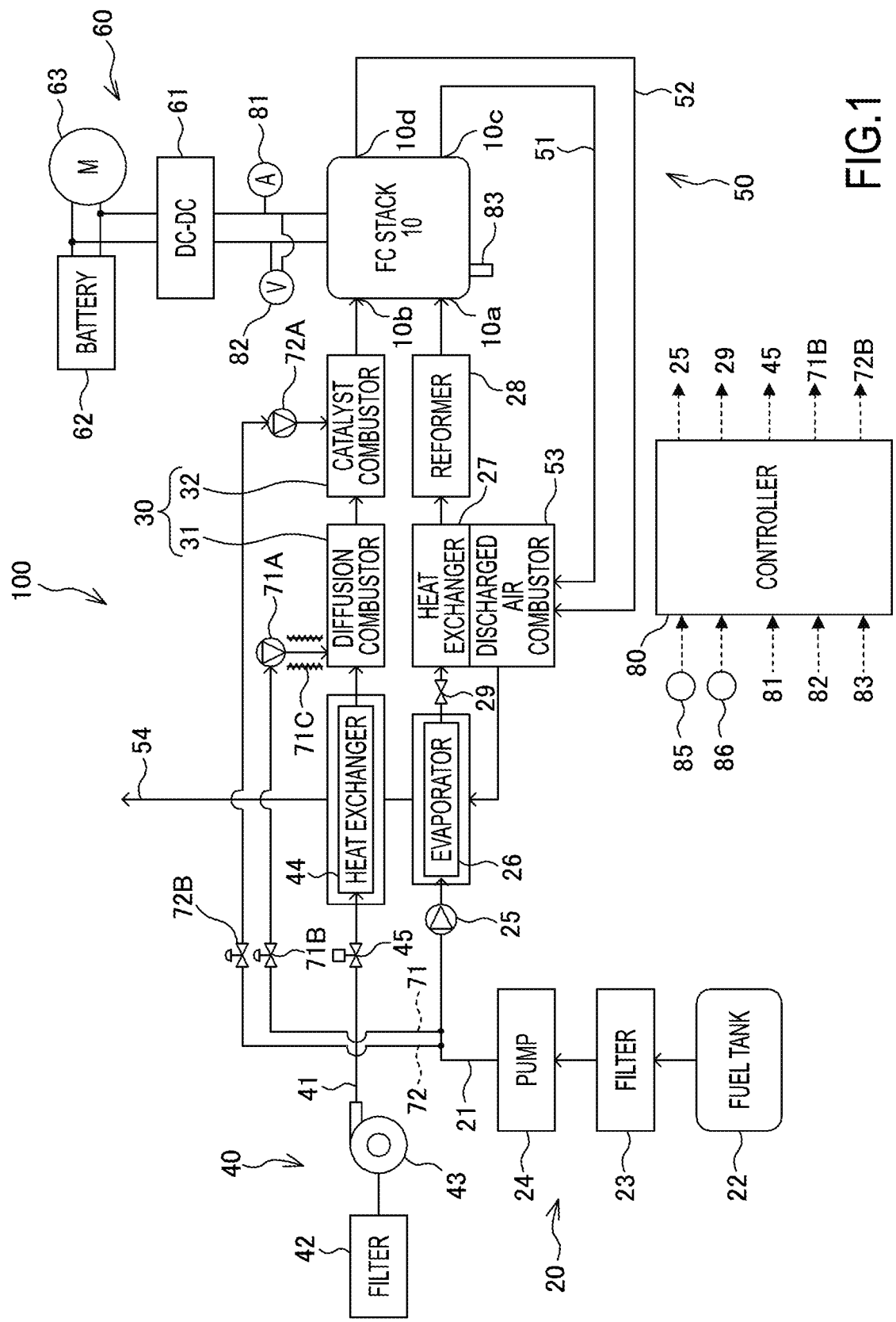
FIG. 1 is a schematic configuration diagram of a fuel cell system according to one embodiment.

FIG. 1 is a schematic configuration diagram illustrating a main configuration of a fuel cell system 100 according to the embodiment.

As illustrated in FIG. 1, the fuel cell system 100 is a solid oxide fuel cell system that includes a solid oxide fuel cell stack 10 that is supplied with a fuel gas (an anode gas) and an air (a cathode gas) as an oxidizing gas to generate electric power, and the fuel cell system 100 is mounted to a vehicle and the like.

The fuel cell stack 10 is a stacked cell in which a plurality of solid oxide fuel cells (SOFC) are stacked. One solid oxide fuel cell (fuel battery cell) is configured such that an electrolyte layer made of a solid oxide such as ceramic is sandwiched between an anode electrode to which a fuel gas is supplied and a cathode electrode to which an air is supplied. For example, the fuel gas is a gas that contains hydrogen, hydrocarbon, and similar material.

The fuel cell stack 10 includes an anode electrode in which an anode flow passage (an anode pole passage) is formed such that the fuel gas supplied from an anode inlet 10a passes through the anode flow passage and an anode discharged gas after use is discharged from an anode outlet 10c. The fuel cell stack 10 includes a cathode electrode in which a cathode flow passage (a cathode pole passage) is formed such that the air supplied from a cathode inlet 10b passes through the cathode flow passage and a cathode off-gas after use is discharged from a cathode outlet 10d.

Furthermore, the fuel cell system 100 is constituted of a fuel supply mechanism 20 that supplies the fuel gas to the fuel cell stack 10, an activation combustion mechanism 30 that combusts the fuel gas and the air, an air supply mechanism 40 that supplies the air to the fuel cell stack 10, an air discharge mechanism 50 that discharges the anode discharged gas and a cathode discharged gas discharged from the fuel cell stack 10, and a power mechanism 60 that inputs/outputs the electric power to/from the fuel cell stack 10. Furthermore, the fuel cell system 100 includes a controller 80 that integrally controls operations of the entire system.

The fuel supply mechanism 20 includes a fuel supply passage 21, a fuel tank 22, a filter 23, a pump 24, an injector 25, an evaporator 26, a heat exchanger 27, a reformer 28, and a pressure control valve 29.

The fuel supply passage 21 is a passage that couples the fuel tank 22 to the anode inlet 10a of the fuel cell stack 10.

The fuel tank 22 is a container that stores, for example, a liquid fuel to be reformed in which ethanol and water are mixed.

The filter 23 is arranged on the fuel supply passage 21 between the fuel tank 22 and the pump 24. The filter 23 removes foreign matters and the like included in the fuel to be reformed before being sucked by the pump 24.

The pump 24 is disposed on the fuel supply passage 21 downstream with respect to the fuel tank 22. The pump 24 sucks the fuel to be reformed stored in the fuel tank 22, and supplies this fuel to the injector 25 and similar unit. It should be noted that an output control of the pump 24 may be executed by the controller 80.

The injector 25 is arranged on the fuel supply passage 21 between the pump 24 and the evaporator 26. The injector 25 injects to supply the fuel supplied from the pump 24 to the evaporator 26.

The evaporator 26 is disposed on the fuel supply passage 21 downstream with respect to the injector 25. The evaporator 26 evaporates the fuel supplied from the injector 25, and supplies to the heat exchanger 27. The evaporator 26 uses a heat of discharged air discharged from a discharged air combustor 53 described later to evaporate the fuel.

The heat exchanger 27 is disposed on the fuel supply passage 21 downstream with respect to the evaporator 26, and arranged so as to be adjacent to the discharged air combustor 53. The heat exchanger 27 uses a heat transmitted from the discharged air combustor 53 to further heat the fuel evaporated in the evaporator 26.

The pressure control valve 29 is disposed on the fuel supply passage 21 between the evaporator 26 and the heat exchanger 27. The pressure control valve 29 adjusts a pressure of the evaporated fuel supplied to the heat exchanger 27. The pressure control valve 29 has an opening degree controlled by the controller 80.

The reformer 28 is disposed on the fuel supply passage 21 between the heat exchanger 27 and the fuel cell stack 10. The reformer 28 uses a catalyst disposed in this reformer 28 to reform the fuel. The fuel to be reformed is reformed into a fuel gas containing hydrogen, hydrocarbon, carbon monoxide, and similar material through a catalytic reaction in the reformer 28. The thus reformed fuel gas is supplied in the anode pole passage via the anode inlet 10a of the fuel cell stack 10 while keeping a high temperature state.

It should be noted that the fuel supply passage 21 includes branch passages 71, 72 branched from this fuel supply passage 21. The branch passage 71 is branched from the fuel supply passage 21 between the pump 24 and the injector 25, and coupled to an injector 71A that supplies the fuel to a diffusion combustor 31. The branch passage 71 includes an open/close valve 71B that opens and closes this branch passage 71. The injector 71A includes an electric heater 71C as a heating device for evaporating the liquid fuel.

The branch passage 72 is branched from the fuel supply passage 21 between the pump 24 and the injector 25, and coupled to an injector 72A that supplies the fuel to a catalyst combustor 32. The branch passage 72 includes an open/close valve 72B that opens and closes this branch passage 72.

The above-described open/close valves 71B, 72B have opening degrees controlled by the controller 80. In this embodiment, the open/close valves 71B, 72B are controlled to open/close when the fuel cell system 100 is activated and stopped.

Next, the air supply mechanism 40 and the activation combustion mechanism 30 will be described.

The air supply mechanism 40 includes an air supply passage 41, a filter 42, an air blower 43, a heat exchanger 44, a throttle 45, and similar unit. The activation combustion mechanism 30 includes the diffusion combustor 31, the catalyst combustor 32, and similar unit.

The air supply passage 41 is a passage that couples the air blower 43 to the cathode inlet 10b of the fuel cell stack 10.

The air blower 43 is an air supply device that takes in an external air (an air) through the filter 42 and supplies the taken air to the fuel cell stack 10 and similar unit as the cathode gas. In this embodiment, an air flow rate sent out by the air blower 43 may be controlled by the controller 80. It should be noted that the filter 42 removes foreign matters included in the air before being taken in by the air blower 43.

The heat exchanger 44 is disposed on the air supply passage 41 downstream with respect to the air blower 43. The heat exchanger 44 is a device that uses the heat of the discharged air discharged from the discharged air combustor 53 to heat the air. The air heated by the heat exchanger 44 is supplied to the diffusion combustor 31 that constitutes a part of the activation combustion mechanism 30.

The throttle 45 is disposed on the air supply passage 41 between the air blower 43 and the heat exchanger 44. The throttle 45 is configured to have an adjustable opening degree, and the air flow rate is adjusted corresponding to the opening degree. The opening degree of the throttle 45 is controlled by the controller 80.

The diffusion combustor 31 is arranged on the air supply passage 41 downstream with respect to the heat exchanger 44. When the system is activated, the air from the air blower 43 and the fuel injected from the injector 71A are supplied in the diffusion combustor 31. The fuel injected from the injector 71A is heated by the electric heater 71C to be supplied to the diffusion combustor 31 in the evaporated state.

After termination of the activation, the fuel supply and an operation of an ignition device are stopped, and the air supplied from the air blower 43 is supplied to the catalyst combustor 32 passing through the diffusion combustor 31.

The catalyst combustor 32 is disposed on the air supply passage 41 between the diffusion combustor 31 and the fuel cell stack 10. The catalyst combustor 32 is a device that internally includes the catalyst and uses this catalyst to generate a combustion gas in a high temperature.

To the catalyst combustor 32, in a warm-up operation performed on the activation of the fuel cell stack 10, the air from the air supply passage 41 and the fuel injected from the injector 72A are supplied in the catalyst combustor 32. The catalyst in the catalyst combustor 32 is heated by a preheating burner, and the air and the fuel are combusted on the heated catalyst to generate the combustion gas. The combustion gas is an inert gas in the high temperature hardly containing oxygen, and supplied to the fuel cell stack 10 to heat this fuel cell stack 10 and similar unit. Then, the temperature of the fuel cell stack 10 can be increased to a desired operating temperature. It should be noted that when the warming up terminates and the operation transitions to a usual operation, the fuel supply to the catalyst combustor 32 is stopped and the combustion in the catalyst combustor 32 temporarily stops.

As described above, the catalyst combustor 32 is originally used as an activation combustor that supplies the combustion gas to the fuel cell stack 10 at the warm-up operation of the fuel cell stack 10. However, in this embodiment, even during a system stop process after a system stop request, the catalyst combustor 32 is used as a combustor that supplies the combustion gas to the cathode inlet 10b of the fuel cell stack 10. This combustion gas supply to the cathode inlet 10b of the fuel cell stack 10 during the system stop process will be described later in detail.

It should be noted that at the usual operation other than at the above-described activation, at the warm-up operation, and during system stop process, the fuel supply to the diffusion combustor 31 and the catalyst combustor 32 via the branch passages 71, 72 is stopped, and the air from the air blower 43 is supplied to the fuel cell stack 10 passing through the diffusion combustor 31 and the catalyst combustor 32.

Next, the air discharge mechanism 50 will be described. The air discharge mechanism 50 includes an anode-discharged-gas discharge passage 51, a cathode-discharged-gas discharge passage 52, the discharged air combustor 53, a joined discharge passage 54, and similar unit.

The anode-discharged-gas discharge passage 51 couples the anode outlet 10c in the fuel cell stack 10 to an anode side inlet portion of the discharged air combustor 53. The anode-discharged-gas discharge passage 51 is a passage through which a discharged gas (the anode discharged gas) containing the fuel gas discharged from a fuel flow passage of the fuel cell stack 10 flows.

The cathode-discharged-gas discharge passage 52 couples the cathode outlet 10d in the fuel cell stack 10 to a cathode side inlet portion of the discharged air combustor 53. The cathode-discharged-gas discharge passage 52 is a passage through which a discharged gas (the cathode discharged gas) discharged from the cathode flow passage in the fuel cell stack 10 flows.

The discharged air combustor 53 catalytically combusts the anode discharged gas and the cathode discharged gas supplied to be joined from the anode-discharged-gas discharge passage 51 and the cathode-discharged-gas discharge passage 52, thus generating the discharged air mainly containing carbon dioxide and water.

Since the discharged air combustor 53 is disposed so as to be adjacent to the heat exchanger 27, the heat caused by the catalytic combustion in the discharged air combustor 53 is transmitted to the heat exchanger 27. The heat thus transmitted to the heat exchanger 27 is used for heating the fuel.

The discharged air combustor 53 has a gas outlet portion (a downstream end) coupled to the joined discharge passage 54. The discharged air discharged from the discharged air combustor 53 is discharged outside the fuel cell system 100 passing through the joined discharge passage 54. The joined discharge passage 54 is configured so as to pass through the evaporator 26 and the heat exchanger 44, and the evaporator 26 and the heat exchanger 44 are heated by the discharged air passing through the joined discharge passage 54.

Next, the power mechanism 60 will be described. The power mechanism 60 includes a DC-DC converter 61, a battery 62, a drive motor 63, and an inverter (not illustrated).

The DC-DC converter 61 is electrically coupled to the fuel cell stack 10, and boosts an output voltage of the fuel cell stack 10 to supply electric power to the battery 62 or the drive motor 63. The battery 62 is configured to charge the electric power supplied from the DC-DC converter 61 and supply the electric power to the drive motor 63. Accordingly, the DC-DC converter 61 appropriately increases and decreases the output voltage of the fuel cell stack 10.

The drive motor 63 is a three-phase AC motor, and functions as a power source of a vehicle. The drive motor 63 is coupled to the battery 62 and the DC-DC converter 61 via the inverter (not illustrated). This drive motor 63 generates a regenerative electric power on braking the vehicle. This regenerative electric power is used for charging the battery 62, for example.

Then, the above-described fuel cell system 100 further includes various kinds of sensors such as a current sensor 81, a voltage sensor 82, and a stack temperature sensor 83.

The current sensor 81 detects the output current (hereinafter referred to as "a stack current" as well) as an extraction current extracted from the fuel cell stack 10. The voltage sensor 82 detects the output voltage (hereinafter referred to as "a stack voltage V" as well) of the fuel cell stack 10, that is, an inter-terminal voltage between an anode electrode side terminal and a cathode electrode side terminal.

The stack temperature sensor 83 is disposed on the fuel cell stack 10, and detects a temperature (hereinafter referred to as "a stack temperature Ts" as well) of this fuel cell stack 10.

Next, the controller 80 that integrally controls the operations of the entire system as described above is constituted of a microcomputer that includes a central processing unit (CPU), a read-only memory (ROM), a random access memory (RAM), and an input/output interface (an I/O interface). The controller 80 executes specific programs to execute processes for controlling the fuel cell system 100.

The controller 80 receives signals from sensors configured to detect vehicle conditions, such as an outside air temperature sensor 85 that detects an outside air temperature Ta and an accelerator stroke sensor 86 that detects a depression amount of an accelerator pedal, in addition to signals from the various sensors such as the current sensor 81, the voltage sensor 82, and the stack temperature sensor 83. The controller 80 performs opening degree controls on the various valves and the injector and the output control on each actuator on the basis of those signals.

Especially, in this embodiment, the controller 80 executes the system stop process when the controller 80 receives a request for stopping the fuel cell system 100, for example, a detection of an off operation of the key switch (not illustrated). In this system stop process, the controller 80 controls a fuel system actuator (a combustion fuel supply device) of the fuel supply mechanism 20, such as the open/close valve 72B of the branch passage 72, and an air system actuator (a combustion oxidizing gas supply device) of the air supply mechanism 40, such as the throttle 45, to execute the fuel supply and the air supply to the catalyst combustor 32. That is, the controller 80 functions as a post-stop-request combustor-supply control unit that executes the fuel supply and the air supply to the catalyst combustor 32 after the request for stopping the fuel cell system 100.

Furthermore, the controller 80 of this embodiment appropriately executes the control of the combustion fuel supply device, for example, opening of the open/close valve 72B of the branch passage 72, and the control of the combustion oxidizing gas supply device, for example, opening of the throttle 45, during the warm-up operation at the activation of the fuel cell stack 10, thus supplying the fuel and the air to the catalyst combustor 32. Therefore, the combustion gas from the catalyst combustor 32 is supplied to the fuel cell stack 10. Then, after the termination of the warm-up operation, the controller 80 controls the combustion oxidizing gas supply device to stop the air supply to the catalyst combustor 32.

In the fuel cell system 100 having the above-described configuration, the electric power supply to the drive motor 63 is stopped according to the system stop request triggered by, for example, the key-off operation by a driver of a vehicle and a full charge of the battery 62, and the system stop process as a fuel cell stop process after the system stop request is executed. In this system stop process, while the fuel gas supply to the fuel cell stack 10 is stopped, the air supply to the fuel cell stack 10 is continued, thus cooling this fuel cell stack 10. The following describes the system stop process.

Figure 2:
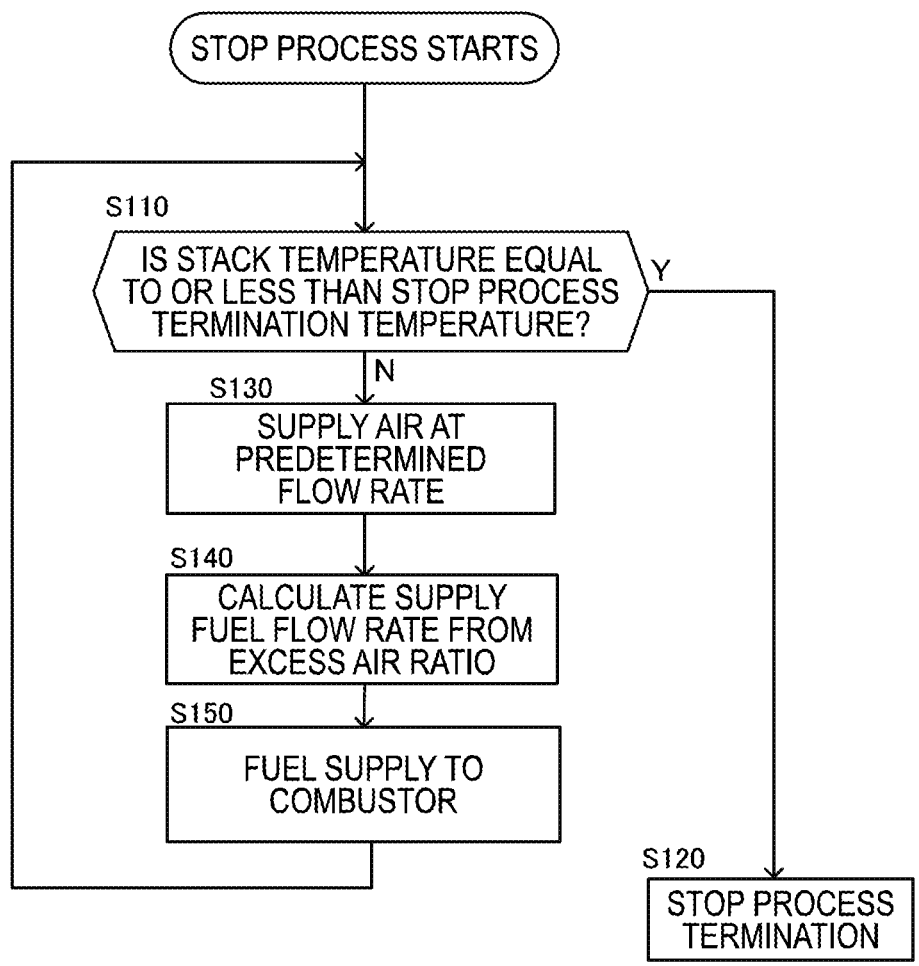
FIG. 2 is a flowchart illustrating a flow of a system stop process according to the one embodiment.

FIG. 2 is a flowchart illustrating a flow of the system stop process according to this embodiment.

In Step S110, the controller 80 determines whether or not the stack temperature Ts is equal to or less than a stop process termination temperature Te at which the system stop process is to be terminated. Here, the stop process termination temperature Te is a temperature supposed not to cause an undesirable reaction such as an oxidation reaction of the anode pole in the fuel cell stack 10. That is, the stop process termination temperature Te is a cooling target temperature (for example, about 300° C.) of the fuel cell stack 10.

When the stack temperature Ts is determined to be equal to or less than the stop process termination temperature Te, the process proceeds to Step S120, and the controller 80 terminates the system stop process.

Meanwhile, in Step S110, when the stack temperature Ts is determined to be greater than the stop process termination temperature Te, the process proceeds to Step S130, and the air having a predetermined flow rate is supplied to the catalyst combustor 32. Specifically, the controller 80 increases the opening degree of the throttle 45 before the system stop process.

In Step S140, the controller 80 calculates a fuel gas flow rate to be supplied to the catalyst combustor 32 on the basis of the air flow rate supplied to the catalyst combustor 32 and a preliminarily configured excess air ratio (a stoichiometric ratio) λ as an excess ratio of the oxidizing gas.

Here, the excess air ratio λ is an index indicating how much the air flow rate supplied to the catalyst combustor 32 is excessive relative to the fuel gas flow rate supplied to the catalyst combustor 32 from the aspect to combust this air with this fuel in the proper quantity. That is, the excess air ratio λ is obtained by, for example, (a mass flow rate of the actually supplied air)/(a mass flow rate of the air necessary to perfect combustion of the fuel gas).

Accordingly, when the fuel gas is supplied to the catalyst combustor 32 so as to have the excess air ratio=1, the air supplied to the catalyst combustor 32 is combusted with the fuel gas exactly in the proper quantity. When the fuel gas is supplied to the catalyst combustor 32 so as to have the excess air ratio<1, the amount of the fuel gas is excessive relative to the air. Furthermore, when the fuel gas is supplied to the catalyst combustor 32 so as to have the excess air ratio>1, the fuel gas is insufficient relative to the air.

In this embodiment, the excess air ratio λ is preferably configured to be one or less from the aspect of preventing the oxidative degradation of the anode pole. This causes all the air supplied to the catalyst combustor 32 to be combusted to be consumed, thus increasing the effect of reducing the oxidative degradation of the anode pole. Especially, configuring the excess air ratio λ=1 is most preferable.

In Step S150, the fuel is supplied to the catalyst combustor 32 on the basis of the fuel gas flow rate calculated in Step S140.

This causes the fuel gas and the air to combust in the catalyst combustor 32, thus generating the inert combustion gas. Then, this combustion gas is supplied to the cathode inlet 10b in the fuel cell stack 10 from the catalyst combustor 32 passing through the air supply passage 41.

It should be noted that in a certain period of time after the system stop request, since the inside of the catalyst combustor 32 is kept in a high temperature, the combustion reaction of the combustion gas and the air occurs without operating the burner of this catalyst combustor 32. However, when the temperature inside the catalyst combustor 32 has become lower than a desired temperature due to the elapse of time to some extent after the system stop request, the burner of the catalyst combustor 32 may be operated to heat inside the catalyst combustor 32.

As described above, by being supplied from the catalyst combustor 32 to the cathode inlet 10b in the fuel cell stack 10, a part of the air having a high oxygen concentration in the cathode pole passage of the fuel cell stack 10 is discharged from the inside of this cathode pole passage via the cathode-discharged-gas discharge passage 52. That is, a part of the air having the high oxygen concentration in the cathode pole passage of the fuel cell stack 10 is replaced to the combustion gas from the catalyst combustor 32, and an oxygen partial pressure in this cathode pole passage (hereinafter referred to as "a cathode oxygen partial pressure" as well) decreases.

Accordingly, an oxygen partial pressure of a gas cross leaking from this cathode pole passage to the inside of the anode pole passage of the fuel cell stack 10 decreases as well. Then, an oxygen partial pressure in the anode pole passage (hereinafter referred to as "an anode oxygen partial pressure" as well) decreases.

It should be noted that in the following description, the process where the air and the fuel are supplied to the catalyst combustor 32 to supply the inert combustion gas generated in the catalyst combustor 32 to the cathode inlet 10b of the fuel cell stack 10, as above-described Step S130 to Step S150, will be referred to as "a combustion gas replacement process" as well.

Next, the decrease of the cathode oxygen partial pressure by the combustion gas replacement process and the decrease of the anode oxygen partial pressure caused by this will be described in more detail.

Figure 3A:
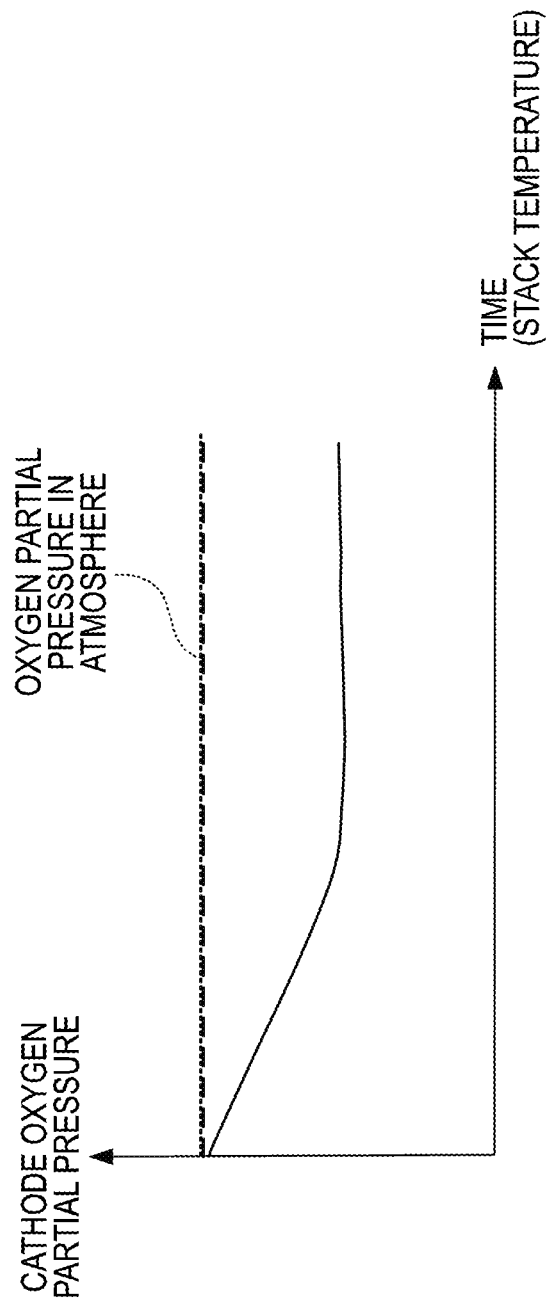
FIG. 3A is a timing chart illustrating a variation of a cathode oxygen partial pressure corresponding to a time passage.
Figure 3B:
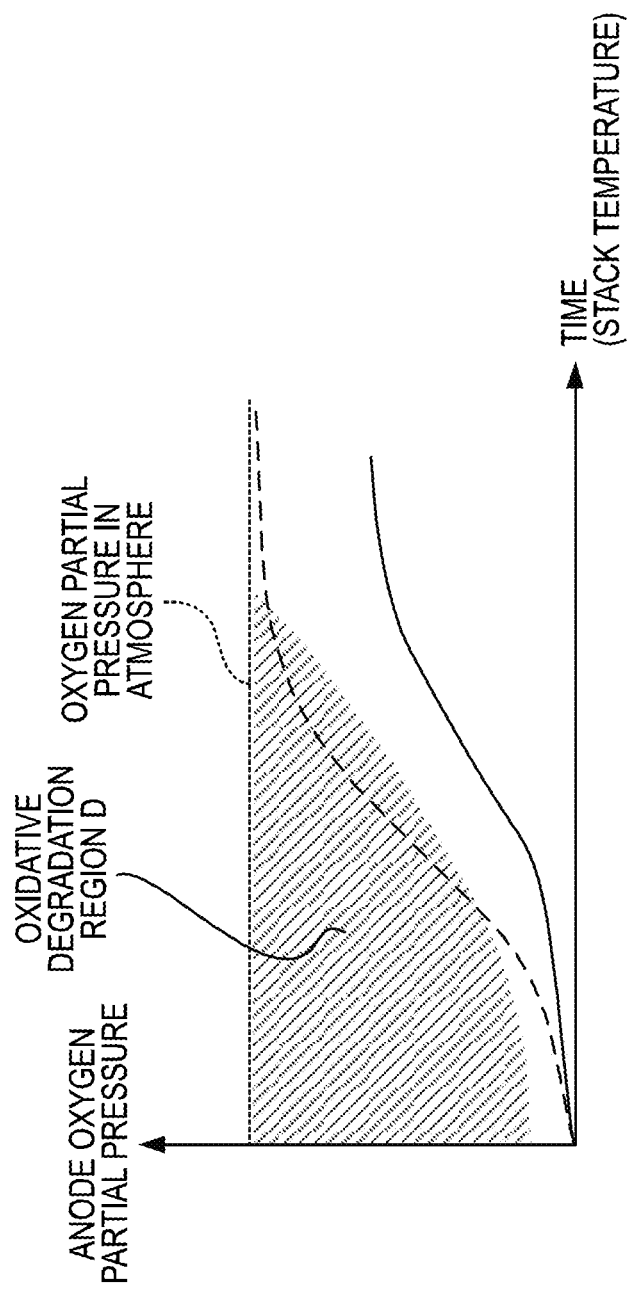
FIG. 3B is a timing chart illustrating a variation of an anode oxygen partial pressure corresponding to a time passage.

FIG. 3A is a timing chart illustrating a variation of the cathode oxygen partial pressure corresponding to a time passage, and FIG. 3B is a timing chart illustrating a variation of the anode oxygen partial pressure corresponding to a time passage. It should be noted that FIG. 3A and FIG. 3B indicate values of the oxygen partial pressure in the atmosphere by dotted lines. FIG. 3A and FIG. 3B indicate variations of the anode oxygen partial pressure in the case where the combustion gas replacement process is not performed, as a comparative example, by dashed lines for reference. Furthermore, FIG. 3B especially illustrates an oxidative degradation region D by diagonal lines indicating a region of the anode oxygen partial pressure where the oxidative degradation of the anode pole possibly occurs equal to or more than an acceptable degree from the aspect of durability and maintaining the performance of the fuel cell stack 10.

As illustrated in FIG. 3B, the oxidative degradation region D varies corresponding to a time (decrease of the stack temperature Ts) indicating a progress degree of the system stop process. That is, the oxidative degradation region D is large near the start of the system stop process (that is, immediately after the system stop request), and decreases as the system stop process progresses.

The reason why the oxidative degradation region D is thus relatively large near the start of the system stop process is in an energy state where the stack temperature Ts is still high at an early stage of the system stop process and the oxidation reaction easily progresses on the anode pole. Meanwhile, at a later stage where the system stop process has progressed to some extent, since the stack temperature Ts has decreased, a period of time before the system stop process terminates is relatively short. In this case, since the oxidation reaction is relatively hard to progress on the anode pole and the oxidative degradation is less likely to occur, the oxidative degradation region D becomes relatively small.

Furthermore, the cathode oxygen partial pressure of the comparative example indicated by the dashed line in FIG. 3A has values approximately equal to the oxygen partial pressure in the atmosphere regardless of the progress of the system stop process. In contrast, in this embodiment indicated by the solid line in FIG. 3A, the cathode oxygen partial pressure decreases over time compared with the oxygen partial pressure in the atmosphere due to performing combustion gas replacement process, thus approaching a constant value lower than the value of the oxygen partial pressure in the atmosphere.

Meanwhile, the anode oxygen partial pressure, indicated by the dashed line in FIG. 3B, in the case where the combustion gas replacement process has not been performed has a value close to zero because the inside of the anode pole passage is filled with the fuel gas at a time 0 (at the start of the system stop process). However, as the system stop process progresses, the fuel supply to the fuel cell stack 10 is stopped, and the anode oxygen partial pressure increases in accordance with passage of time due to influences of the cross leak from the cathode pole to the anode pole and a back diffusion from the anode-discharged-gas discharge passage 51 to the anode pole. Especially, when the system stop process progresses to some extent, this anode oxygen partial pressure increases to enter the oxidative degradation region D.

In contrast, the anode oxygen partial pressure of this embodiment, indicated by the solid line in FIG. 3B, in the case where the combustion gas replacement process has been performed is low compared with the anode oxygen partial pressure in the case where the combustion gas replacement process has not been performed, and has a small increased amount corresponding to the progress of the system stop process. Then, even if the system stop process progresses, this anode oxygen partial pressure varies without entering the oxidative degradation region D.

The above-described fuel cell system 100 provides the following effects.

The fuel cell system 100 according to the embodiment includes the fuel cell stack 10 as the fuel cell, the catalyst combustor 32 as the combustor that combusts the fuel and the oxidizing gas to supply the combustion gas to the cathode inlet 10b of the fuel cell stack 10, the fuel tank 22, the pump 24, the branch passage 72, the injector 72A, and the open/close valve 72B as the combustion fuel supply device that supplies the fuel to the catalyst combustor 32, the air blower 43 and the throttle 45 as the combustion oxidizing gas supply device that supplies the air as the oxidizing gas to the catalyst combustor 32, the anode-discharged-gas discharge passage 51 that discharges the anode off-gas as the anode discharged gas from the anode outlet 10c of the fuel cell stack 10, the cathode-discharged-gas discharge passage 52 that discharges the cathode off-gas as the cathode discharged gas from the cathode outlet 10d of the fuel cell stack 10, and the controller 80 that controls the fuel supply to the catalyst combustor 32 by the combustion fuel supply device and the oxidizing gas supply to the catalyst combustor 32 by the combustion oxidizing gas supply device.

Then, in this fuel cell system 100, the controller 80 functions as the post-stop-request combustor-supply control unit that executes the fuel supply and the oxidizing gas supply to the catalyst combustor 32 after the request for stopping the fuel cell system 100 (Step S130 to Step S150).

That is, in this embodiment, the fuel and the air are supplied to the catalyst combustor 32 in the fuel cell system 100 during the system stop process performed after the request for stopping the fuel cell system 100, and the combustion gas generated by this catalyst combustor 32 is supplied to the cathode inlet 10b of the fuel cell stack 10.

Accordingly, during the system stop process after the request for stopping the fuel cell system 100, the fuel and the air are supplied to the catalyst combustor 32, and the combustion gas generated by combustion in the catalyst combustor 32 is supplied to the cathode inlet 10b of the fuel cell stack 10. Then, the combustion gas is supplied to the cathode pole passage in the fuel cell stack 10, and the gas having the high oxygen concentration in the cathode pole passage is discharged from the inside of this cathode pole passage via the cathode-discharged-gas discharge passage 52 and similar passage to be replaced to the combustion gas, and the cathode oxygen partial pressure decreases. Consequently, during the system stop process, the gas replaced to the combustion gas having a low oxygen partial pressure in the cathode pole passage enters into the anode pole passage through the cross leak, thus reducing the increase of the anode oxygen partial pressure in the fuel cell stack 10.

Thus entering of the combustion gas from the cathode pole passage into the anode pole passage increases the pressure in the anode pole passage to prevent the back diffusion from the anode-discharged-gas discharge passage 51. This ensures reducing the increase of the oxygen partial pressure in the anode pole caused by this back diffusion as well.

Accordingly, the oxidative degradation of the anode pole of the fuel cell stack 10 during the system stop process is prevented.

Especially, in the fuel cell system 100 according to the embodiment, the catalyst combustor 32 is an activation combustor 30 of the fuel cell stack 10 that is supplied with the fuel and the air during the warm-up operation executed at the activation of the fuel cell stack 10 and combusts this fuel and air to supply the combustion gas to the cathode inlet 10b. Then, after the termination of the warm-up operation, the controller 80 stops the air supply to the activation combustor 30 (the catalyst combustor 32).

That is, in this embodiment, the catalyst combustor 32 as the activation combustor, which is originally used during the warm-up operation executed at the activation of the fuel cell stack 10, can be used to execute the combustion gas supply to the fuel cell stack 10 during the above-described system stop process.

Accordingly, the existing catalyst combustor 32 for activation and the supply mechanisms of the fuel and the air accompanying the catalyst combustor 32 can be used to execute the system stop process according to the embodiment without complicating the configuration of the fuel cell system 100. Especially, using the catalyst combustor 32 during the above-described warm-up operation keeps the inside of the catalyst combustor 32 in high temperature on the whole when the warm-up operation terminates to be transitioned to the usual operation and subsequently the system stop is requested. Then, only supplying the fuel and the air to the catalyst combustor 32 during the system stop process after the system stop request ensures combusting the combustion gas and the air without operating the burner of this catalyst combustor 32.

Furthermore, in the fuel cell system 100 according to the embodiment, the controller 80, which functions as the post-stop-request combustor-supply control unit, adjusts the supply amount of the fuel such that the excess air ratio λ as the excess ratio of the air relative to the fuel has the predetermined value where the oxidative degradation of the anode pole of the fuel cell stack 10 is reduced. This ensures preventing the oxidative degradation of the anode pole of the fuel cell stack 10 with more certainty.

Especially, in the fuel cell system 100 according to the embodiment, the supply amount of the fuel is preferred to be adjusted such that the excess air ratio λ is one. This reduces the air to be mixed in the combustion gas supplied from the catalyst combustor 32 to the cathode inlet 10b of the fuel cell stack 10. Then, the oxygen concentration of the gas cross leaking to the anode pole can be reduced as a result, thus more preferably reducing the oxidative degradation of the anode pole. Furthermore, the excessive fuel remaining in the anode pole can be prevented.

Furthermore, in the fuel cell system 100 according to the embodiment, the catalyst combustor 32 is arranged on the air supply passage 41 as an oxidizing gas supply passage that supplies the air to the cathode inlet 10b of the fuel cell stack 10. This ensures executing the air supply to the catalyst combustor 32 and the air supply to the cathode inlet 10b of the fuel cell stack 10 via the identical air supply passage 41 while having the air blower 43 as the combustion oxidizing gas supply device as the identical air supply source, thus reducing the complication of the system configuration.

Then, as described above, in this embodiment, the control method for the fuel cell system 100 is executed such that during the stop process of the fuel cell stack 10 in the fuel cell system 100, the fuel and the air are supplied to the catalyst combustor 32 in the fuel cell system 100, and the combustion gas generated by the catalyst combustor 32 is supplied to the cathode inlet 10b of the fuel cell stack 10.

Accordingly, during the stop process of the fuel cell stack 10, the fuel and the air are supplied to the catalyst combustor 32, and the combustion gas generated by the combustion in the catalyst combustor 32 is supplied to the cathode inlet 10b of the fuel cell stack 10. Then, the combustion gas is supplied to the cathode pole passage in the fuel cell stack 10, the gas having the high oxygen concentration in the cathode pole passage is discharged from the inside of this cathode pole passage via the cathode-discharged-gas discharge passage 52 and similar passage to be replaced to the combustion gas, and the cathode oxygen partial pressure decreases. Consequently, during the stop process of the fuel cell stack 10, the gas replaced to the combustion gas having the low oxygen partial pressure in the cathode pole passage enters into the anode pole passage through the cross leak, thus reducing the increase of the anode oxygen partial pressure in the fuel cell stack 10.

Second Embodiment

The following describes a second embodiment. It should be noted that like reference numerals designate components identical to those described in the first embodiment, and therefore such components will not be further elaborated here.

Figure 4:
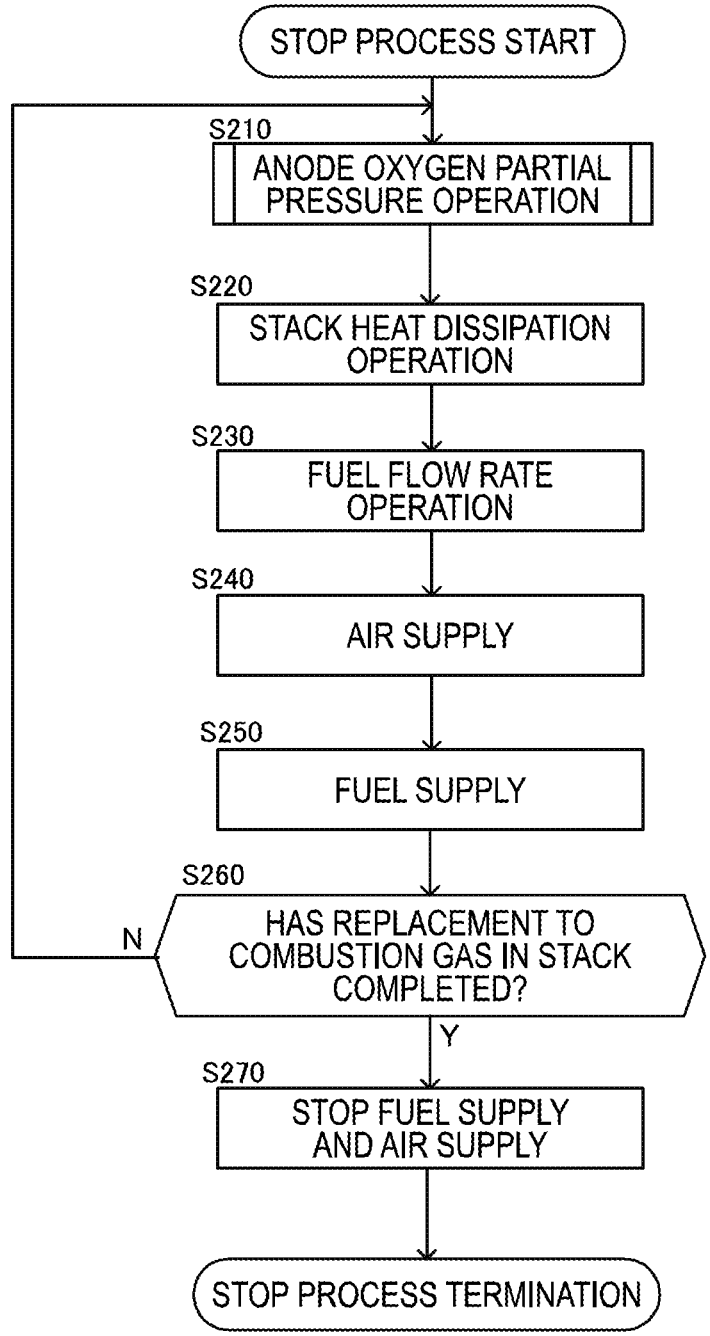
FIG. 4 is a flowchart illustrating a flow of a system stop process according to the one embodiment.

FIG. 4 is a flowchart illustrating a flow of a system stop process according to the embodiment.

As illustrated in the drawing, in Step S210, after the start of the system stop process, the controller 80 operates an anode oxygen partial pressure PaO2 in the fuel cell stack 10.

Figure 5:
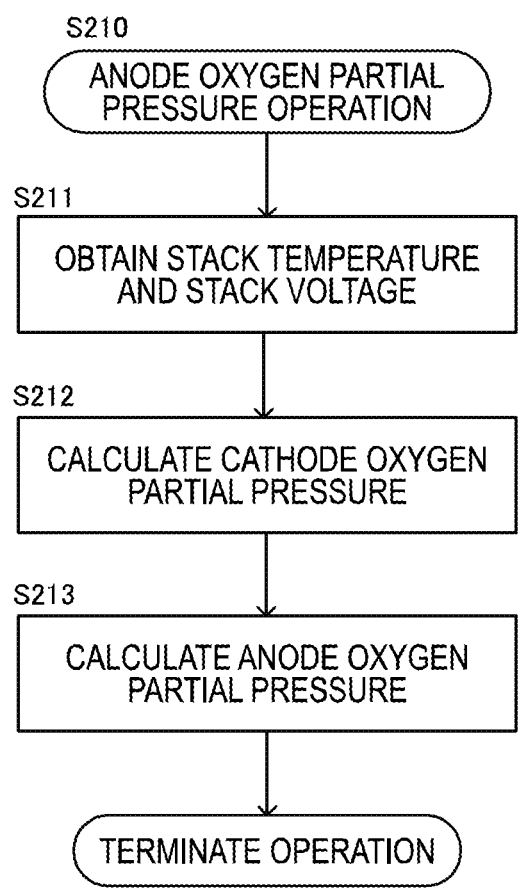
FIG. 5 is a flowchart describing a method for operating the anode oxygen partial pressure according to the one embodiment.

FIG. 5 is a flowchart describing a method for operating the anode oxygen partial pressure PaO2 according to the embodiment.

As illustrated in the drawing, in Step S211, the controller 80 obtains the stack temperature Ts detected by the stack temperature sensor 83 and the stack voltage V detected by the voltage sensor 82.

In Step S212, the controller 80 calculates a cathode oxygen partial pressure PcO2 on the basis of the stack temperature Ts and the stack voltage V. Specifically, the cathode oxygen partial pressure PcO2 is determined according to a predetermined map on the basis of the excess air ratio λ after the system stop process.

Figure 6:
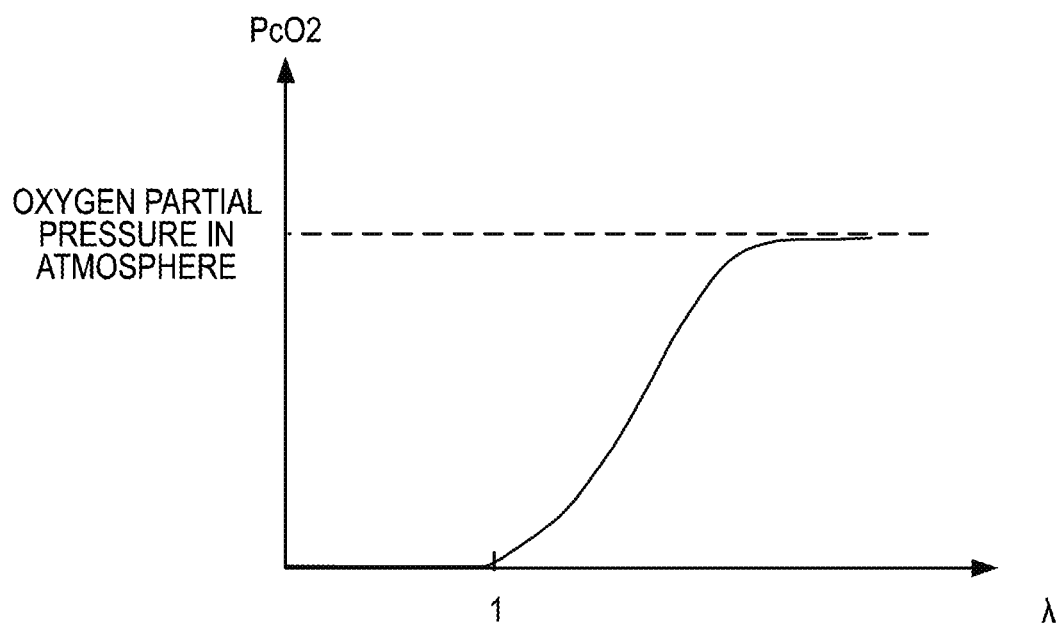
FIG. 6 is an exemplary map illustrating a relation between an excess air ratio and the cathode oxygen partial pressure.

FIG. 6 is an exemplary map illustrating a relation between the excess air ratio λ and the cathode oxygen partial pressure PcO2. By using the map illustrated in the drawing, the cathode oxygen partial pressure PcO2 is obtained from the excess air ratio λ.

Here, as apparent from the map in FIG. 6, in a region of the excess air ratio λ>1, an air supply amount is excessive relative to a fuel supply amount in the combustion in the catalyst combustor 32, thus the cathode oxygen partial pressure PcO2 has a comparatively large value. Meanwhile, in a region of the excess air ratio λ≤1, the fuel is supplied in the proper quantity or insufficient relative to the air supply amount in the combustion in the catalyst combustor 32. In view of this, in the region of the excess air ratio λ≤1, the cathode oxygen partial pressure PcO2 has a value close to zero.

Then, in this embodiment, the cathode oxygen partial pressure PcO2 is obtained at a certain value of the excess air ratio λ≤1, and used for calculating the anode oxygen partial pressure PaO2 described later.

Referring again to FIG. 5, in Step S213, the controller 80 calculates the anode oxygen partial pressure PaO2. Specifically, the controller 80 calculates the anode oxygen partial pressure PaO2 with the following formula on the basis of the stack voltage V, the stack temperature Ts, and the cathode oxygen partial pressure PcO2 calculated in Step S212.

$$\ln(PaO2) = \ln(PcO2) - \frac{4F}{RT}V \qquad \text{[Equation 1]}$$

Note that, in the formula, ln means a natural logarithm, R means a gas constant, and F means a Faraday constant. T is the stack temperature Ts.

Here, in this embodiment, the calculated anode oxygen partial pressure PaO2 needs to be less than an upper limit threshold value Pth(T) determined from the aspect where the oxidative degradation of the anode pole possibly occurs equal to or more than an acceptable degree from the aspect of durability and maintaining the performance of the fuel cell stack 10.

Therefore, the anode oxygen partial pressure PaO2 is not included in the oxidative degradation region D described in FIG. 3B. Accordingly, in this embodiment, the above-described excess air ratio λ is determined such that the anode oxygen partial pressure PaO2 is less than the upper limit threshold value Pth(T). Especially, the excess air ratio λ is preferred to be one or less, and most preferred to be one.

On the other hand, as described already, the oxidative degradation region D decreases as the system stop process progresses. Accordingly, the upper limit threshold value Pth(T) has a value increasing in accordance with the decrease of the stack temperature Ts as the system stop process progresses. That is, in the case where the stack temperature Ts is relatively low, the anode oxygen partial pressure PaO2 is hard to exceed the upper limit threshold value Pth(T) even if the value of the anode oxygen partial pressure PaO2 is large.

Figure 7:
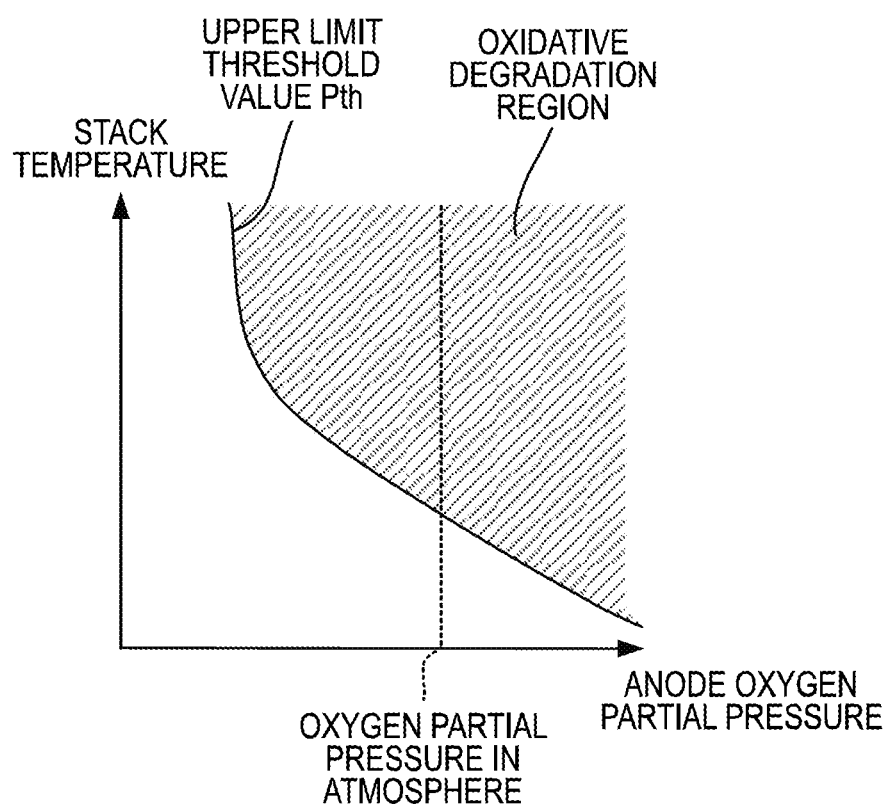
FIG. 7 is a graph illustrating a relation between a stack temperature, the anode oxygen partial pressure, and an upper limit threshold value.

FIG. 7 is a graph illustrating a relation between the stack temperature Ts, the anode oxygen partial pressure PaO2, and the upper limit threshold value Pth(T). It should be noted that a part illustrated by diagonal lines in the drawing means the oxidative degradation region D. As apparent from a curved line of the upper limit threshold value Pth(T) illustrated in the drawing, the value of the upper limit threshold value Pth(T) increases in accordance with the decrease of the stack temperature Ts as the system stop process progresses. This is because, as already described, the earlier stage the system stop process is at, the higher the anode oxygen partial pressure PaO2 becomes and the higher the possibility of the anode oxidation deterioration becomes, and the anode oxidation degradation is less likely to occur as the system stop process progresses even if the anode oxygen partial pressure PaO2 is high.

Referring again to FIG. 4, in Step S220, the controller 80 operates a heat dissipation of the fuel cell stack 10. Specifically, the controller 80 operates a heat dissipation Qs of the fuel cell stack 10 on the basis of the stack temperature Ts and the outside air temperature Ta adding physical properties such as a thermal capacity of the stack constituting member.

In Step S230, the controller 80 operates a flow rate of the fuel to be supplied to the catalyst combustor 32 on the basis of the heat dissipation Qs operated in Step S220. Specifically, the controller 80 operates the fuel flow rate such that a heat amount generated by the combustion in the catalyst combustor 32 becomes a heat amount less than the heat dissipation Qs of the fuel cell stack 10 operated in Step S220.

Thus operating the fuel flow rate to be supplied to the catalyst combustor 32 causes the heat amount of the combustion gas generated in the catalyst combustor 32 not to exceed the heat dissipation Qs of the fuel cell stack 10. Then, the fuel cell stack 10 can be cooled even if this combustion gas is supplied to the fuel cell stack 10. That is, the stop process (cooling) of the fuel cell stack 10 can be performed even while the combustion gas generated by operating the catalyst combustor 32 is supplied to the fuel cell stack 10.

In Step S240, the air having the predetermined flow rate is supplied to the catalyst combustor 32. Specifically, in this embodiment, the controller 80 adjusts the output of the air blower 43 such that the air blower 43 as the combustion oxidizing gas supply device has an output flow rate as a lowest flow rate configurable on the specification of this air blower 43. It should be noted that in the adjustment of the air flow rate to be supplied to the catalyst combustor 32 to a desired flow rate, the opening degree of the throttle 45 may be adjusted as necessary instead of or along with the output of the air blower 43.

In Step S250, the controller 80 supplies the fuel to the catalyst combustor 32. This causes the fuel to be combusted with the air in the catalyst combustor 32 to generate the combustion gas, and the generated combustion gas is sent into the cathode pole passage in the fuel cell stack 10. That is, the combustion gas replacement process is executed. It should be noted that when the temperature in the catalyst combustor 32 has decreased, the burner in the catalyst combustor 32 may be operated.

In Step S260, the controller 80 determines whether or not the air in the anode pole in the fuel cell stack 10 is replaced to the combustion gas from the catalyst combustor 32 by the combustion gas replacement process.

Specifically, the controller 80 detects whether or not a temporal variation of the stack voltage V has occurred to determine whether or not the gas in the anode pole is replaced to the combustion gas. That is, since it has been known that the stack voltage V correlates with a ratio of the anode oxygen partial pressure to the cathode oxygen partial pressure, when the combustion gas replacement process perfectly terminates, the anode oxygen partial pressure does not have the ratio to the cathode oxygen partial pressure. Then, the controller 80 determines that the combustion gas replacement process has terminated.

Then, in Step S270, the fuel supply and the air supply to the catalyst combustor 32 are stopped.

On the other hand, in Step S260, the combustion gas replacement process is determined not to have been completed, the process returns to Step S210 to repeat this routine again.

The above-described fuel cell system 100 provides the following effects.

In the fuel cell system 100 according to the embodiment, the controller 80 functions as an anode oxygen partial pressure operation unit that operates the anode oxygen partial pressure PaO2 as the oxygen partial pressure of the anode pole of the fuel cell stack 10 (see Step S210 in FIG. 5). The controller 80 functions as the post-stop-request combustor-supply control unit adjusts the fuel amount to be supplied to the catalyst combustor 32 on the basis of the anode oxygen partial pressure PaO2 (see Step S230 and Step S250 in FIG. 4). Then, the fuel amount to be supplied to the catalyst combustor 32 can be preferably determined corresponding to the anode oxygen partial pressure PaO2.

Furthermore, the controller 80 functions as the post-stop-request combustor-supply control unit adjusts the supply amount of the fuel such that the anode oxygen partial pressure PaO2 becomes less than the upper limit threshold value Pth(T). This reduces the anode oxidation degradation due to the increase of the anode oxygen partial pressure PaO2 during the system stop process with more certainty.

Especially, the upper limit threshold value Pth(T) is obtained corresponding to the stack temperature Ts. More specifically, the upper limit threshold value Pth(T) increases as the stack temperature Ts decreases.

That is, the upper limit threshold value Pth(T) can be configured to be relatively low at an early stage of the system stop process where the anode oxidation degradation occurs with a high possibility due to the increase of the anode oxygen partial pressure PaO2, and the upper limit threshold value Pth(T) can be configured to be relatively high at a progressed stage of the system stop process where the anode oxidation degradation is less likely to occur even if the anode oxygen partial pressure PaO2 is high. This reduces an evaluation of the anode oxygen partial pressure PaO2 in a safety side more than necessary regardless of a low possibility of the occurrence of the anode oxidation degradation. Consequently, the fuel can be supplied to the catalyst combustor 32 with more certainty by an appropriate amount from the aspect of generating the combustion gas by the necessary and sufficient amount on the execution of the combustion gas replacement process.

Furthermore, in the fuel cell system 100 according to the embodiment, the controller 80 that functions as the anode oxygen partial pressure operation unit operates the anode oxygen partial pressure PaO2 on the basis of the stack temperature Ts, the cathode oxygen partial pressure PcO2 as the oxygen partial pressure of the cathode pole of the fuel cell, and the stack voltage V as the inter-terminal voltage of the fuel cell. This ensures easily and highly accurately operating the anode oxygen partial pressure PaO2.

In the fuel cell system 100 according to the embodiment, the controller 80 that functions as the post-stop-request combustor-supply control unit adjusts the fuel supply amount such that the heat generation amount of the combustion by the catalyst combustor 32 is equal to or less than the heat dissipation Qs of the fuel cell stack 10.

Then, since the heat amount of the combustion gas generated by the catalyst combustor 32 does not exceed the heat dissipation Qs of the fuel cell stack 10, the fuel cell stack 10 can be cooled even if this combustion gas is supplied to the fuel cell stack 10. That is, the stop process (cooling) of the fuel cell stack 10 can be performed even while the combustion gas generated by operating the catalyst combustor 32 is supplied to the fuel cell stack 10.

Furthermore, in this embodiment, the controller 80 that functions as the post-stop-request combustor-supply control unit controls the air supply flow rate to the fuel cell stack 10 to the lowest flow rate. It should be noted that, here, "the lowest flow rate" means a lowest value configurable as the air flow rate to be supplied to the fuel cell stack 10 considering the design of the fuel cell system 100 such as a lowest value of the air flow rate configurable on the specification of the air blower 43.

Then, since the amount of the fuel to the catalyst combustor 32 determined corresponding to the air supply flow rate configured as the lowest flow rate can be reduced to decrease the heat generation amount of the combustion by the catalyst combustor 32 as much as possible, decrease of a cooling speed of the fuel cell stack 10 due to supplying the combustion gas to the fuel cell stack 10 can be reduced.

Especially, the fuel cell system 100 of the embodiment includes the stack temperature sensor 83 as a fuel cell temperature obtaining unit that obtains the stack temperature Ts and the outside air temperature sensor 85 as an outside air temperature obtaining unit that obtains the outside air temperature Ta. Then, the controller 80 functions as a fuel cell heat dissipation calculator that calculates the heat dissipation Qs of the fuel cell stack 10 on the basis of the stack temperature Ts and the outside air temperature Ta. Accordingly, the heat dissipation Qs of the fuel cell stack 10 can be easily and highly accurately calculated.

Third Embodiment

The following describes a third embodiment. It should be noted that like reference numerals designate components identical to those described in the first embodiment or the second embodiment, and therefore such components will not be further elaborated here.

In this embodiment, from the aspect of preventing the oxidative degradation of the anode pole during the system stop process with more certainty, a process (a reverse voltage application process) is considered to be performed as another anode degradation reduction process other than the above-described combustion gas replacement process, the process is performed such that a reverse voltage as a voltage in a reverse direction to the voltage obtained by the electric generation in the fuel cell stack 10 is applied to the fuel cell stack 10.

Figure 8:
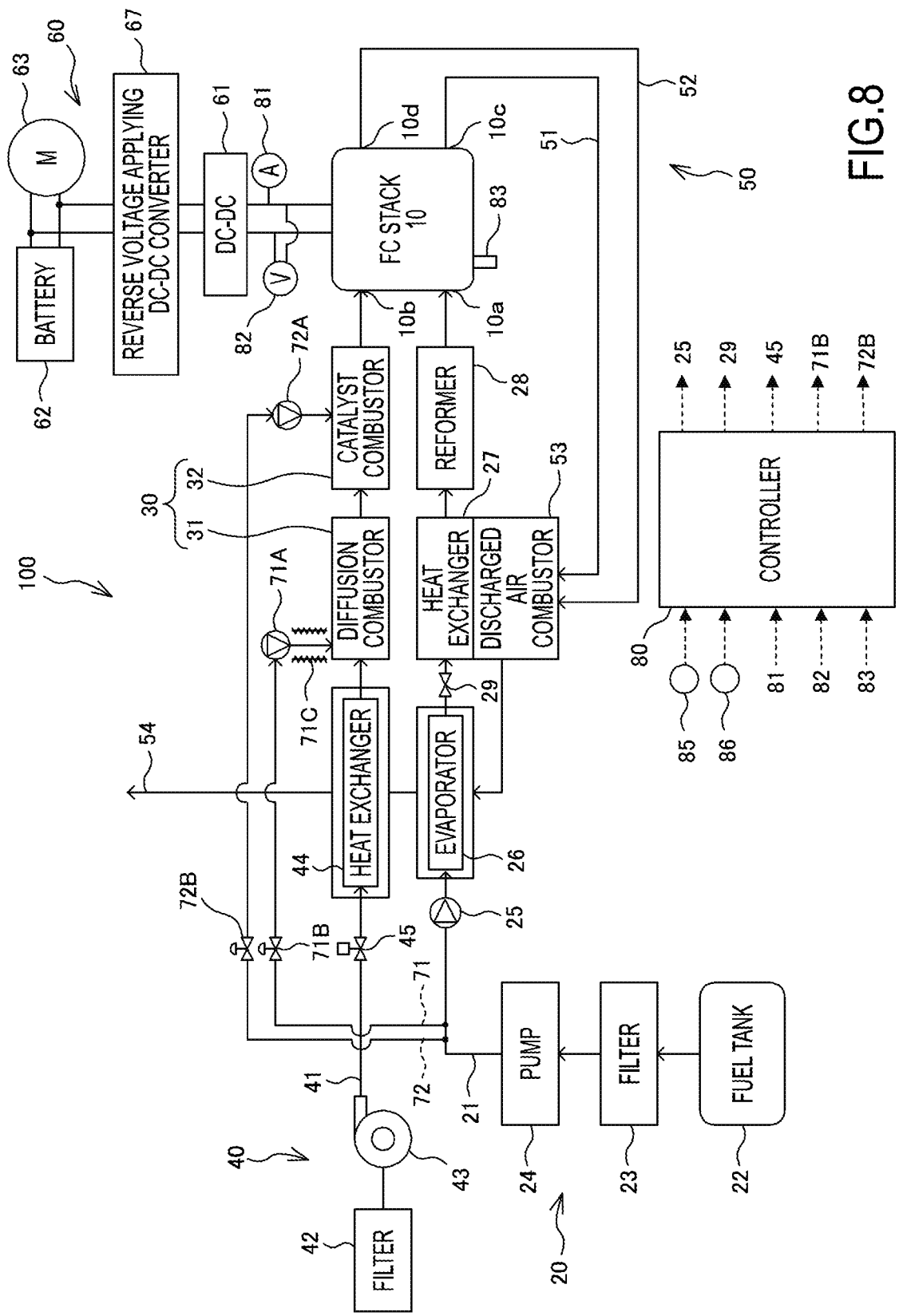
FIG. 8 is a schematic configuration diagram of a fuel cell system according to the one embodiment.

FIG. 8 is a schematic configuration diagram illustrating main configurations of a fuel cell system 100 according to this embodiment. As illustrated in the drawing, in this embodiment, the power mechanism 60 includes a reverse voltage applying DC-DC converter 67 as a reverse voltage applying unit that performs a process to apply a reverse voltage to the fuel cell stack 10.

Figure 9:
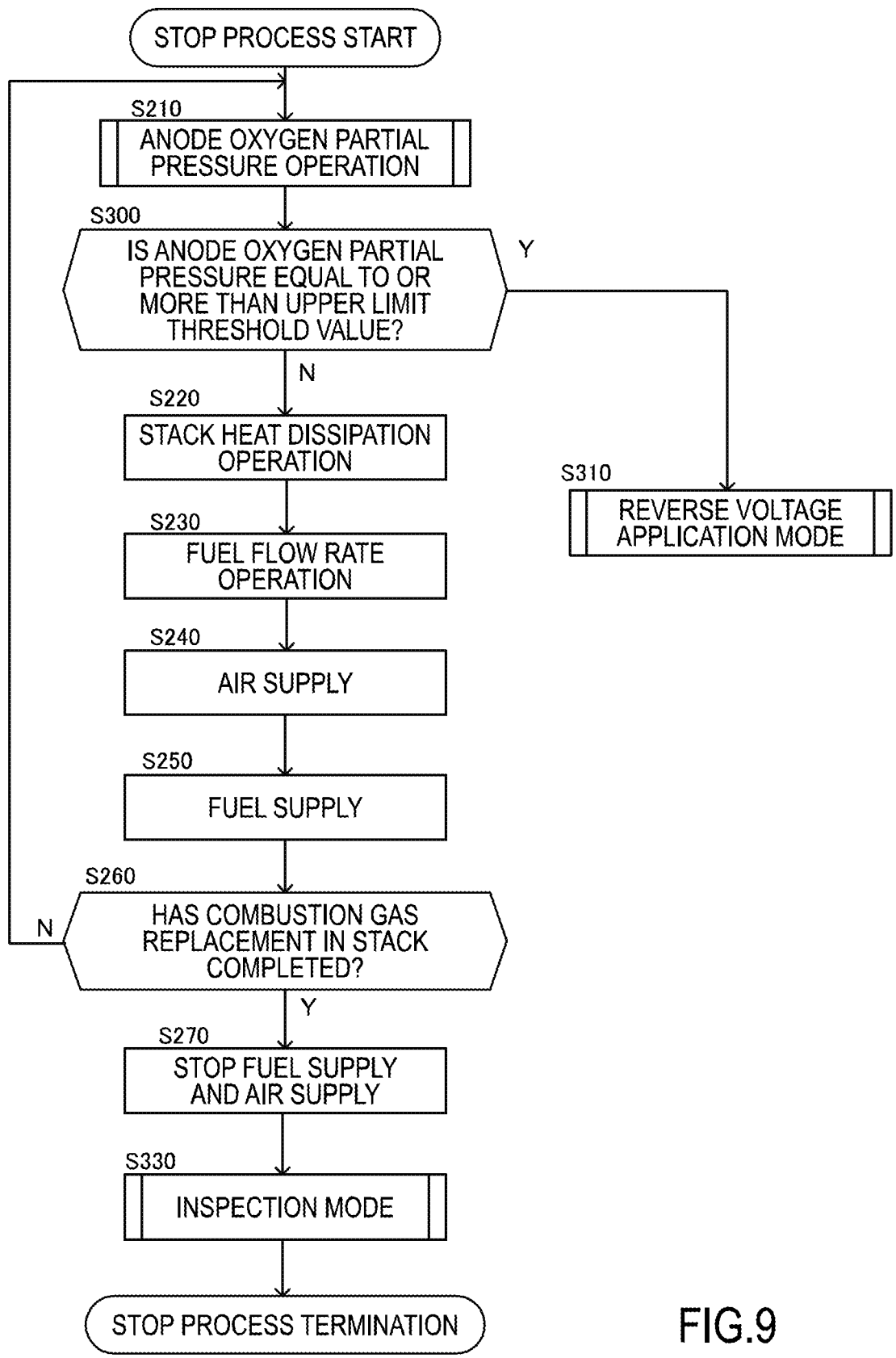
FIG. 9 is a flowchart illustrating a flow of the system stop process according to the one embodiment.

FIG. 9 is a flowchart illustrating a flow of the system stop process according to this embodiment. It should be noted that in the flowchart illustrated in FIG. 9, the processes of Step S210, Step S220, Step S230, Step S240, Step S250, Step S260, and Step S270 are similar to those in the second embodiment, and therefore such processes will not be further elaborated here.

The processes unique to this embodiment compared with the second embodiment are Step S300, Step S310, and Step S330.

In Step S300, the controller 80 determines whether or not the anode oxygen partial pressure PaO2 operated in Step S210 is equal to or more than the upper limit threshold value Pth(T), and when the anode oxygen partial pressure PaO2 is determined to be equal to or more than the upper limit threshold value Pth(T), the process proceeds to a reverse voltage application mode in Step S310. It should be noted that when the anode oxygen partial pressure PaO2 is determined not to be equal to or more than the upper limit threshold value Pth(T), the process proceeds to processes following Step S220.

The execution of the reverse voltage application mode has the following meaning. That is, originally, the execution of the combustion gas replacement process suppresses the increase of the anode oxygen partial pressure PaO2 to equal to or more than the upper limit threshold value Pth(T). However, when the anode oxygen partial pressure PaO2 has increased to equal to or more than the upper limit threshold value Pth(T) due to any event, applying the reverse voltage to the fuel cell stack 10 in addition to the above-described combustion gas replacement process intends to prevent the oxidative degradation of the anode pole with more certainty.

Figure 10:
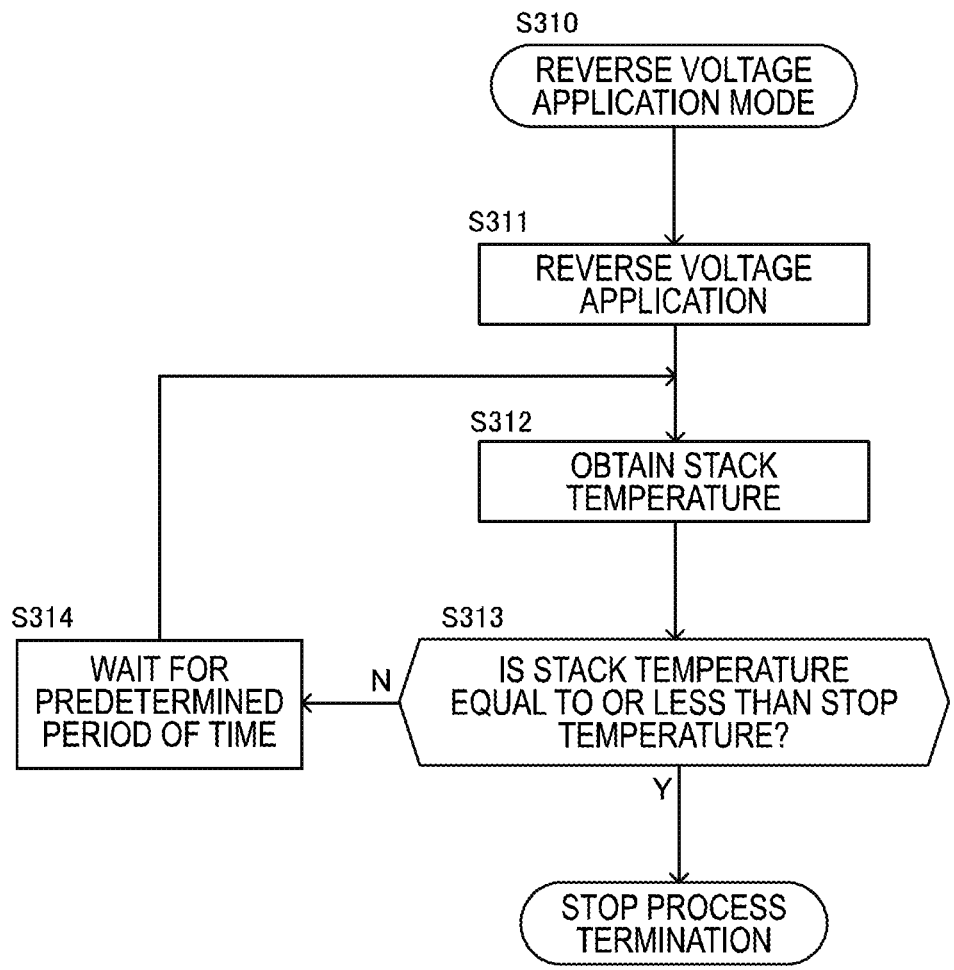
FIG. 10 is a flowchart illustrating a flow of a reverse voltage application mode.

FIG. 10 is a flowchart illustrating a flow of the reverse voltage application mode.

In Step S311, the controller 80 uses the reverse voltage applying DC-DC converter 67 to apply the reverse voltage to the fuel cell stack 10. Here, applying the reverse voltage means to apply a voltage in an opposite direction of a direction of an electromotive force, which is generated by the fuel cell stack 10 through the ordinary electric generation, to this fuel cell stack 10.

It should be noted that the reverse voltage thus applied to the fuel cell stack 10 is configured to be a value higher than a value of an open end voltage caused by the electric generation with the fuel and the air remaining in the fuel cell stack 10. Thus, applying the reverse voltage to the fuel cell stack 10 ensures having a current (electric charge) flowing through the fuel cell stack 10 in a direction opposite to the direction in the state of the ordinary electric generation. Then, in accordance with the movement of the electric charge changed to "from the anode pole to the cathode pole," the oxygen that enters into the anode pole can be transmitted to the cathode pole side via the electrolyte membrane. Accordingly, the reaction of oxygen with nickel on the anode pole can be reduced.

In Step S312, the controller 80 obtains the stack temperature Ts detected by the stack temperature sensor 83.

In Step S313, the controller 80 determines whether or not the stack temperature Ts obtained in Step S312 is equal to or less than the stop process termination temperature Te where applying the reverse voltage is to be stopped.

When the stack temperature Ts is determined to be equal to or less than the stop process termination temperature Te, the controller 80 terminates the reverse voltage application mode to terminate the system stop process. Meanwhile, when the stack temperature Ts is determined not to be equal to or less than the stop process termination temperature Te, the controller 80 waits for a predetermined period of time in Step S314. Then, the controller 80 returns to Step S312, and further executes the determination of Step S313 again. That is, when determines the stack temperature Ts is determined not to be equal to or less than the stop process termination temperature Te, the controller 80 waits until the stack temperature Ts decreases to equal to or less than the stop process termination temperature Te.

On the other hand, in this embodiment, after the catalyst combustor 32 is stopped in Step S270 in FIG. 9, that is, after the combustion gas replacement process terminates, the controller 80 executes an inspection mode in Step S330. The inspection mode is a mode to monitor whether or not the anode oxygen partial pressure PaO2 has become equal to or more than the upper limit threshold value Pth(T) after the performance of the combustion gas replacement process.

That is, when the anode oxygen partial pressure PaO2 becomes equal to or more than the upper limit threshold value Pth(T) in accordance with the progress of the system stop process after the performance of the combustion gas replacement process, the combustion gas replacement process alone is not sufficient for decreasing the anode oxygen partial pressure PaO2. Then, this embodiment intends to perform the above-described reverse voltage application process in such case, and monitor the anode oxygen partial pressure PaO2 after the combustion gas replacement process, thus reducing the anode oxidation degradation with more certainty.

Figure 11:
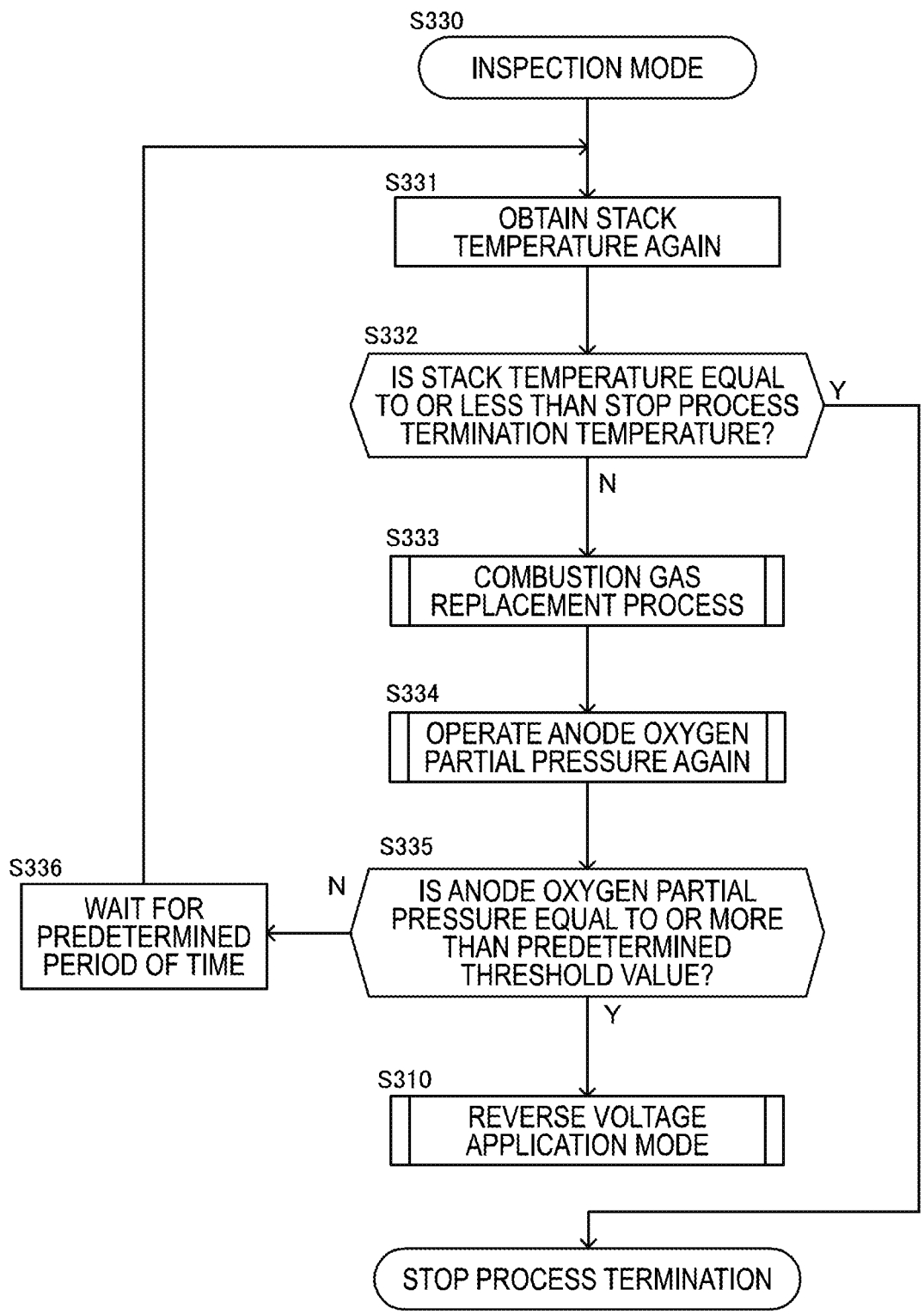
FIG. 11 is a flowchart illustrating a flow of an inspection mode according to the one embodiment.

FIG. 11 is a flowchart illustrating a flow of the inspection mode according to this embodiment.

As illustrated in the drawing, first, in Step S331, the controller 80 obtains the stack temperature Ts detected by the stack temperature sensor 83 again.

In Step S332, the controller 80 determines whether or not the stack temperature Ts is equal to or less than the stop process termination temperature Te. When the stack temperature Ts is determined to be equal to or less than the stop process termination temperature Te, the controller 80 terminates the inspection mode and the system stop process.

That is, when the stack temperature Ts is equal to or less than the stop process termination temperature Te, the reaction causing the anode oxidation degradation does not occur even if the anode oxygen partial pressure PaO2 is high, thus intending to terminate the inspection mode without carrying on. On the other hand, when the stack temperature Ts is determined not to be equal to or less than the stop process termination temperature Te, the controller 80 performs a process of Step S333.

In Step S333, the controller 80 performs the combustion gas replacement process. That is, this intends to execute the combustion gas replacement process again in the inspection to confirm the decrease of the anode oxygen partial pressure PaO2 to less than the upper limit threshold value Pth(T).

When the combustion gas replacement process is executed, the controller 80 operates the anode oxygen partial pressure PaO2 again in Step S334. It should be noted that the re-operation of the anode oxygen partial pressure PaO2 is performed with a method similar to the method performed in Step S210 in this routine.

In Step S335, the controller 80 determines whether or not the anode oxygen partial pressure PaO2 operated in Step S334 is equal to or more than the upper limit threshold value Pth(T). When the anode oxygen partial pressure PaO2 is determined not to be equal to or more than the upper limit threshold value Pth(T), the controller 80 performs a process of Step S336.

In Step S336, the controller 80 returns to Step S331 after waiting for the predetermined period of time. That is, after this, the controller 80 repeats the inspection mode until the stack temperature Ts decreases to reach the stop process termination temperature Te.

On the other hand, when the anode oxygen partial pressure PaO2 is determined to be equal to or more than the upper limit threshold value Pth(T) in the above-described Step S335, the reverse voltage application mode described above in Step S310 is executed. That is, in this case, the anode oxygen partial pressure PaO2 is determined not to falls below the upper limit threshold value Pth(T) with the combustion gas replacement process alone, and the reverse voltage application process is performed so as to decrease the anode oxygen partial pressure PaO2 to a level where the occurrence of the anode oxidation degradation is prevented.

The effects of the above-described fuel cell system 100 of the embodiment will be described compared with a comparative example.

Figure 12A:
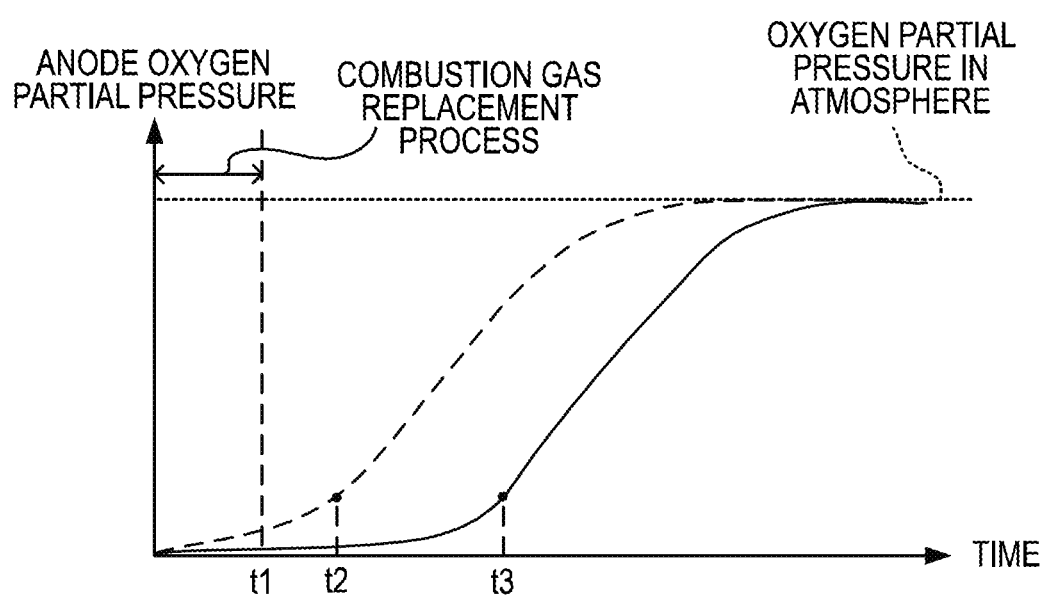
FIG. 12A is a timing chart illustrating a temporal variation of the anode oxygen partial pressure after the system stop process according to the one embodiment.
Figure 12B:
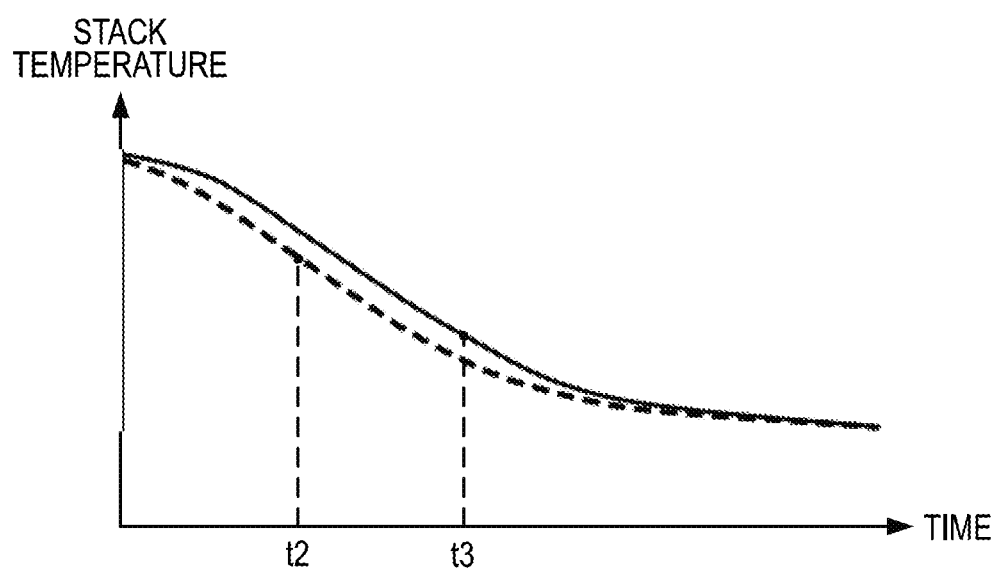
FIG. 12B is a timing chart illustrating a temporal variation of the stack temperature after the system stop process according to the one embodiment.

FIG. 12A is a timing chart illustrating a temporal variation of the anode oxygen partial pressure PaO2 after the system stop process according to this embodiment, and FIG. 12B is a timing chart illustrating a temporal variation of the stack temperature Ts after the system stop process. It should be noted that in FIG. 12A and FIG. 12B, the variations of the anode oxygen partial pressure PaO2 and the stack temperature Ts of the comparative example are indicated by dashed lines for reference.

As illustrated in FIG. 12A, in this embodiment, the combustion gas replacement process is executed in a section from a time 0 to a time t1. Accordingly, as apparent from FIG. 12A, in the fuel cell system 100, the anode oxygen partial pressure PaO2 is decreased as a whole relative to the comparative example where the combustion gas replacement process is not performed.

To describe in more detail, the anode oxygen partial pressure PaO2 usually increases due to the influences of the cross leak and the back diffusion as time passes after the system stop process. However, in this embodiment, the combustion gas replacement process suppresses the increase of the anode oxygen partial pressure PaO2, thus lowering the increase rate of the anode oxygen partial pressure PaO2 in accordance with the progress of the system stop process relative to the comparative example. Accordingly, in this embodiment, even if the anode oxygen partial pressure PaO2 becomes equal to or more than the upper limit threshold value Pth(T) (enters into the oxidative degradation region D), at least the timing can be delayed.

This ensures having a timing to execute the reverse voltage application process at a time t3 later than the time t2 in the comparative example.

On the other hand, as illustrated in FIG. 12B, in the fuel cell system 100 of this embodiment where the combustion gas replacement process is performed, the stack temperature Ts has a slow rate of decrease compared with the comparative example where the combustion gas replacement process is not performed. This is because the combustion gas replacement process uses the catalyst combustor 32 to supply the combustion gas in the high temperature to the fuel cell stack 10.

However, even if the rate of decrease of the stack temperature Ts is thus low, the combustion gas replacement process relatively decreases the anode oxygen partial pressure PaO2 in this embodiment as described above. Then, the timing where the anode oxygen partial pressure PaO2 reaches the upper limit threshold value Pth(T) and the reverse voltage application process is executed can be delayed in total.

Figure 13:
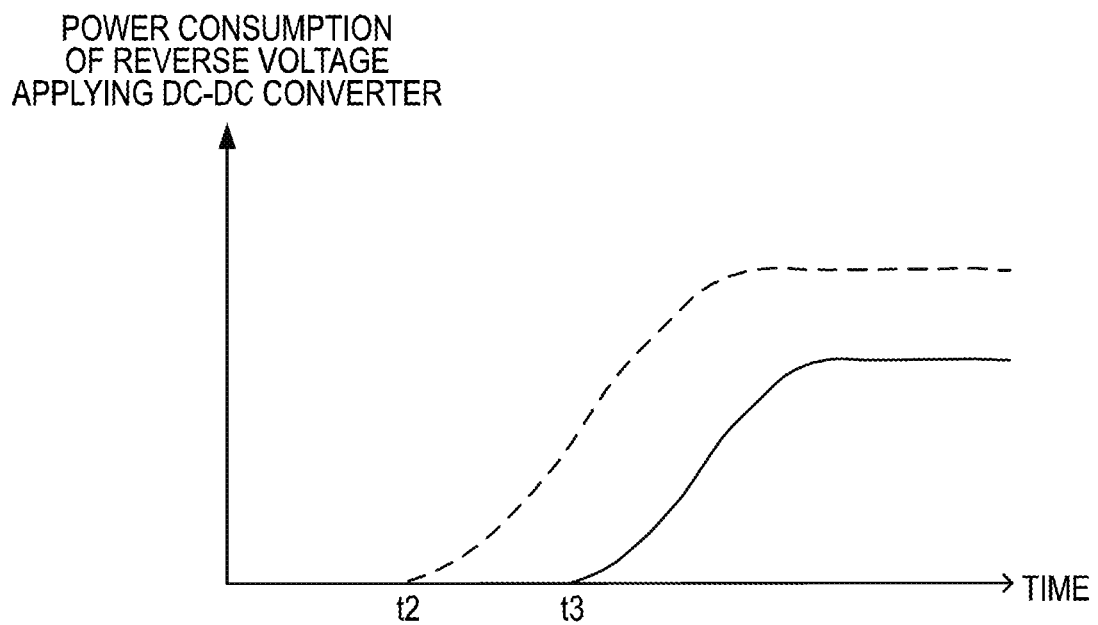
FIG. 13 is a timing chart illustrating a temporal variation of a power consumption of a reverse voltage applying DC-DC converter in a reverse voltage application process.

Furthermore, FIG. 13 is a timing chart illustrating a temporal variation of a power consumption of a reverse voltage applying DC-DC converter 67 in the reverse voltage application process. As apparent from FIG. 13, in the comparative example where the combustion gas replacement process is not performed, the reverse voltage applying DC-DC converter 67 is operated from the time t2, and the power consumption increases after the time t2.

In contrast, in this embodiment where the combustion gas replacement process is performed, the reverse voltage applying DC-DC converter 67 is allowed to be operated from the time t3 later than the time t2. Thus, in this embodiment, the start of the operation of the reverse voltage applying DC-DC converter 67 can be delayed compared with the case where the combustion gas replacement process is not performed, thus shortening the operation period of the reverse voltage applying DC-DC converter 67 to reduce the power consumption.

Furthermore, at the time t3 where the operation of the reverse voltage applying DC-DC converter 67 starts in this embodiment, the system stop process has progressed (the stack temperature Ts has decreased) compared with the time t2 where the operation of the reverse voltage applying DC-DC converter 67 starts in the comparative example, and the open end voltage of the fuel cell stack 10 has decreased as well. Accordingly, the reverse voltage to be applied to the fuel cell stack 10 from the reverse voltage applying DC-DC converter 67 can be configured to be low, thus ensuring the reduction of the maximum value itself of the electric energy of the reverse voltage applying DC-DC converter 67. Consequently, the power consumption can be much more reduced.

The above-described fuel cell system 100 provides the following effects.

In this embodiment, the controller 80 includes the reverse voltage applying DC-DC converter 67 as an anode degradation reduction processing unit that performs another anode degradation reduction process to reduce the anode oxygen partial pressure PaO2 when the anode oxygen partial pressure PaO2 has become equal to or more than the upper limit threshold value Pth(T) after the request for stopping the fuel cell stack 10 and during the supply of the fuel and the air.

Then, when the anode oxygen partial pressure PaO2 becomes equal to or more than the upper limit threshold value Pth(T) even after decreasing the anode oxygen partial pressure PaO2 by the combustion gas replacement process, the anode degradation reduction process can be performed to prevent the anode oxidation degradation during the system stop process with more certainty.

Especially, in this embodiment, the controller 80 that functions as the anode degradation reduction processing unit executes the reverse voltage application process where the electromotive force reverse to the fuel cell stack 10 is applied to the fuel cell stack 10.

Fourth Embodiment

The following describes a fourth embodiment. It should be noted that like reference numerals designate components identical to those described in the third embodiment, and therefore such components will not be further elaborated here. In this embodiment, as the other anode degradation reduction process on the anode pole of the fuel cell stack 10, an additional fuel supply mode where the fuel gas is additionally supplied to the anode inlet 10a of the fuel cell stack 10 is executed instead of the reverse voltage application process in the third embodiment. It should be noted that the fuel cell system 100 has the system configuration similar to the first embodiment.

Figure 14:
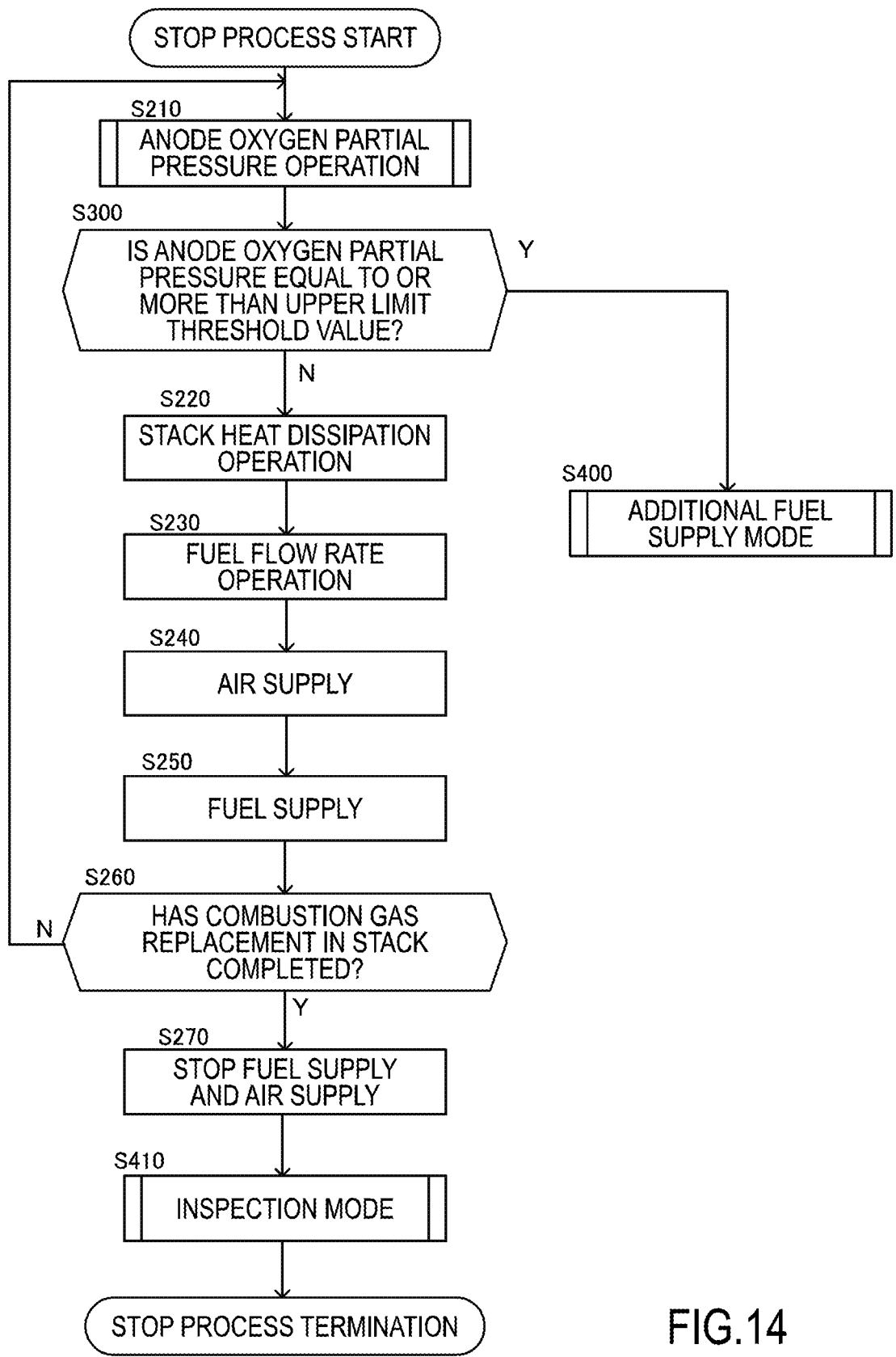
FIG. 14 is a flowchart illustrating a flow of the system stop process according to the one embodiment.

FIG. 14 is a flowchart illustrating a flow of the system stop process according to this embodiment. As illustrated in the drawing, in this embodiment, the controller 80 determines whether or not the anode oxygen partial pressure PaO2 in Step S300 is equal to or more than the upper limit threshold value Pth(T) through the operation of the anode oxygen partial pressure PaO2 in Step S210 similar to the second embodiment.

Here, when the anode oxygen partial pressure PaO2 is determined to be equal to or more than the upper limit threshold value Pth(T), the controller 80 executes the additional fuel supply mode in Step S400.

Figure 15:
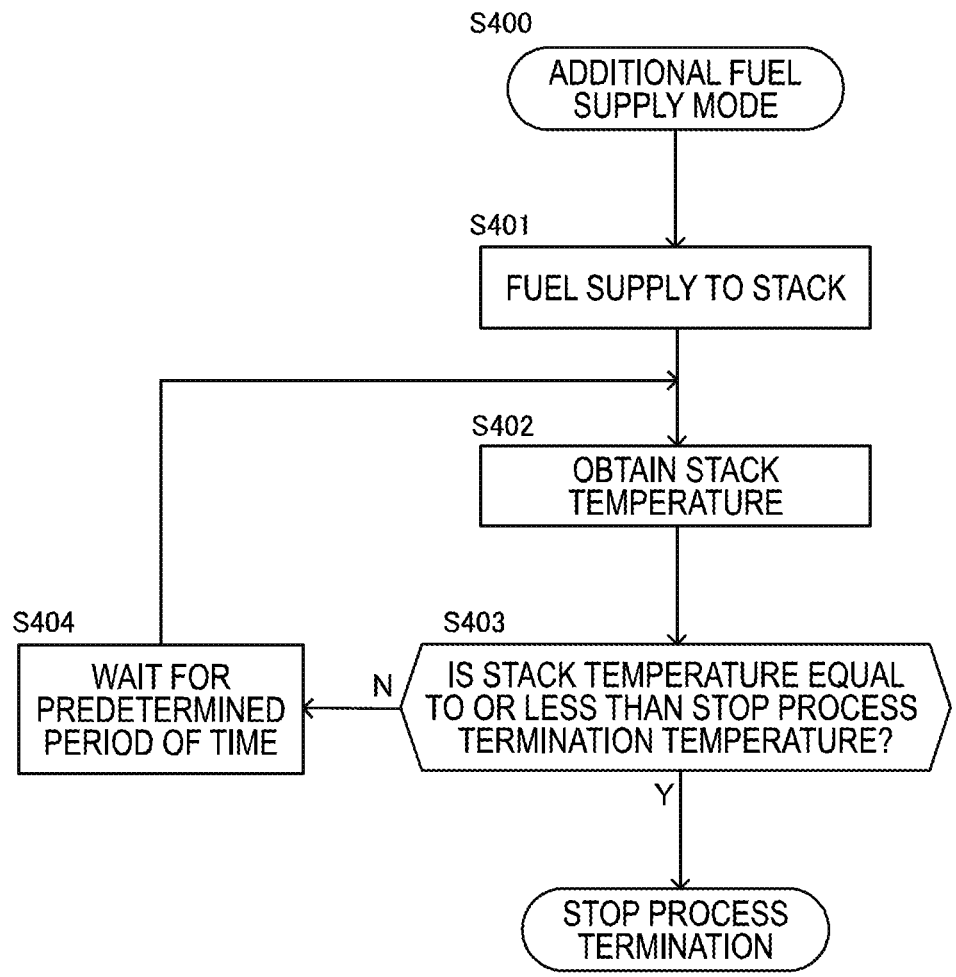
FIG. 15 is a flowchart illustrating a flow of an additional fuel supply mode.

FIG. 15 is a flowchart illustrating a flow of the additional fuel supply mode.

As illustrated in the drawing, in the additional fuel supply mode, the fuel is supplied to the fuel cell stack 10 in Step S401. More specifically, the controller 80 adjusts at least any one of the output of the pump 24 and the opening degree of the pressure control valve 29 illustrated in FIG. 1 corresponding to the flow rate of the fuel gas to be supplied to the fuel cell stack 10, thus supplying the fuel to the reformer 28 from the fuel tank 22 by the desired amount. Then, the fuel gas reformed by the reformer 28 is supplied to the anode inlet 10a of the fuel cell stack 10 by the desired amount.

Thus performed additional fuel process prepares a state where the fuel gas is supplied in the anode pole passage of the fuel cell stack 10 even during the system stop process, thus ensuring the replacement of the air entering into the anode pole passage due to the cross leak and the like to the fuel gas. Accordingly, the additional fuel process performed in addition to the combustion gas replacement process described in the first embodiment and similar embodiment can more preferably suppress the increase of the anode oxygen partial pressure PaO2.

Next, in Step S402, the controller 80 obtains the stack temperature Ts detected by the stack temperature sensor 83.

In Step S403, the controller 80 determines whether or not the stack temperature Ts obtained in Step S302 is equal to or less than the stop process termination temperature Te.

When the stack temperature Ts is determined to be equal to or less than the stop process termination temperature Te, the controller 80 terminates the additional fuel supply mode to terminate the system stop process. On the other hand, when the stack temperature Ts is determined not to be equal to or less than the stop process termination temperature Te, the controller 80 waits for a predetermined period of time in Step S404. Then, after a lapse of the predetermined period of time, the controller 80 returns to Step S402 and further performs the determination of Step S403 again. That is, when the stack temperature Ts is determined not to be equal to or less than the stop process termination temperature Te, the controller 80 waits until the stack temperature Ts becomes equal to or less than the stop process termination temperature Te.

Meanwhile, returning to Step S300 in FIG. 14, when the anode oxygen partial pressure PaO2 is determined not to be equal to or more than the upper limit threshold value Pth(T), the process proceeds to an inspection mode process in Step S410 after performing the processes in Step S220 to Step S270 similar to the second embodiment.

Figure 16:
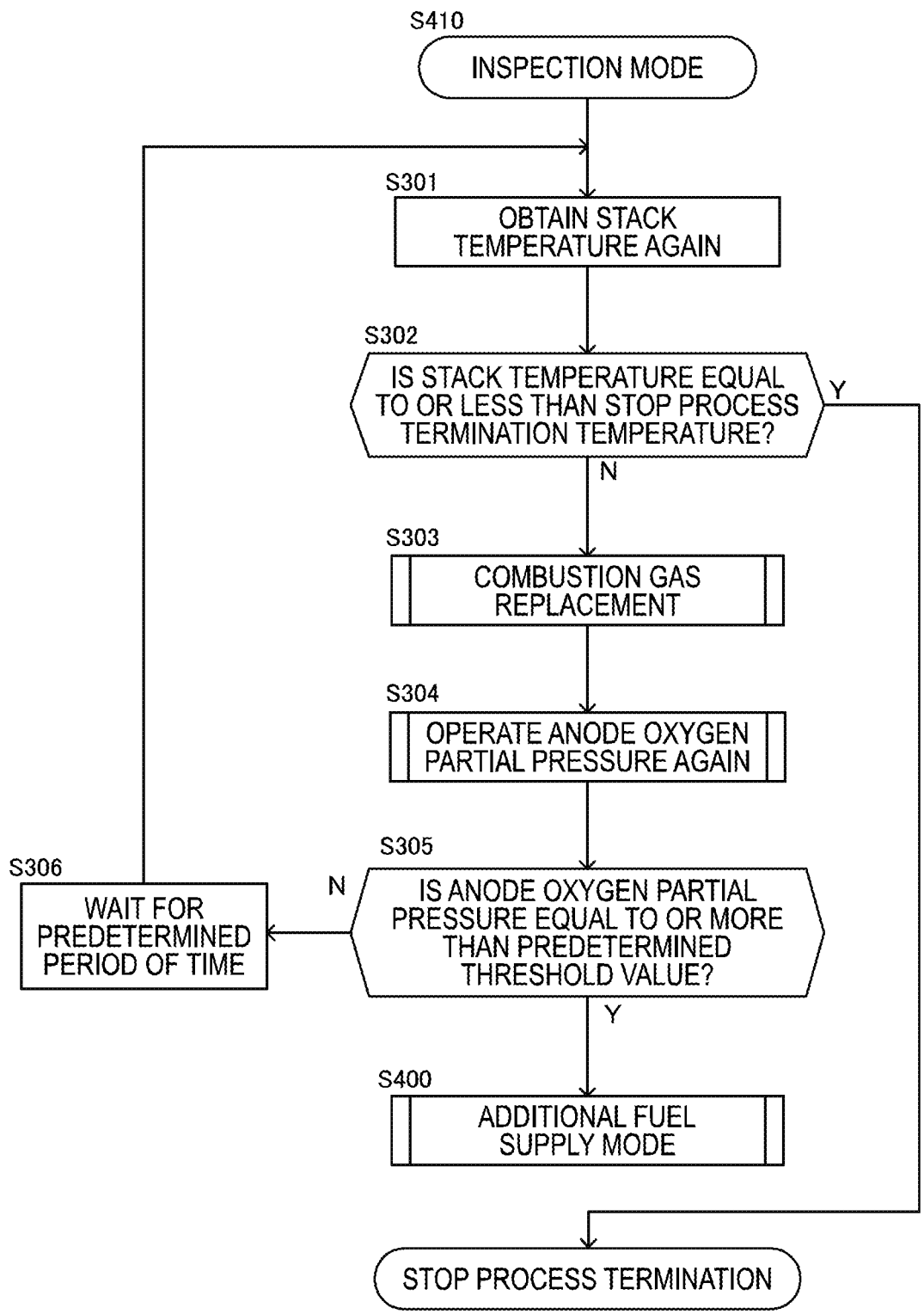
FIG. 16 is a flowchart illustrating a flow of an inspection mode according to the one embodiment.

FIG. 16 is a flowchart illustrating a flow of the inspection mode according to this embodiment. It should be noted that the processes in Step S301 to Step S306 are similar to the processes in the inspection mode of the second embodiment (see FIG. 11). However, in this embodiment, when the anode oxygen partial pressure PaO2 is determined not to be equal to or more than the upper limit threshold value Pth(T) in Step S306, the controller 80 executes the additional fuel supply mode (Step S400) instead of the reverse voltage application mode in the third embodiment.

The above-described fuel cell system 100 provides the following effects.

In this embodiment, the anode degradation reduction process includes a fuel cell fuel supply process (see Step S400 in FIG. 15) that supplies the fuel to the fuel cell stack 10.

Then, when the anode oxygen partial pressure PaO2 exceeds the upper limit threshold value Pth(T) even after decreasing the anode oxygen partial pressure PaO2 by the combustion gas replacement process, the fuel is supplied to the fuel cell stack 10. Accordingly, it is prepared a state where the fuel gas is supplied in the anode pole passage of the fuel cell stack 10, thus ensuring the replacement of the air cross leaking into the anode pole and similar air to the fuel gas. Therefore, the additional fuel process performed in addition to the above-described combustion gas replacement process ensures more preferably suppressing the increase of the anode oxygen partial pressure PaO2.

The embodiments of the present invention described above are merely illustration of some application examples of the present invention and not of the nature to limit the technical scope of the present invention to the specific constructions of the above embodiments.

In the above-described embodiments, as the combustor that supplies the combustion gas to the fuel cell stack 10 during the system stop process, the catalyst combustor 32 as one unit in the activation combustion mechanism 30 is used. However, the diffusion combustor 31 may be used instead of or in combination with the catalyst combustor 32. A combustor that supplies the combustion gas to the fuel cell stack 10 may be additionally disposed separately from the catalyst combustor 32.

For example, a reverse voltage process and an additional fuel supply process as the anode degradation reduction processes in the third embodiment and the forth embodiment are not required processes and not necessary to be executed insofar as the anode oxygen partial pressure PaO2 does not exceed the upper limit threshold value Pth(T). Meanwhile, from the aspect of preventing the oxidative degradation of the anode pole with more certainty, the above-described anode degradation reduction process may be performed even in the case where the anode oxygen partial pressure PaO2 does not exceed the upper limit threshold value Pth(T).

The oxidative degradation region D may be specified with various kinds of parameters correlatable with the anode oxidation degradation as the index other than the anode oxygen partial pressure such as the cathode oxygen partial pressure. The reverse voltage application process may be used in combination with an additional fuel injection process. For the operation of the anode oxygen partial pressure, instead of or in addition to the stack temperature Ts, the cathode oxygen partial pressure PcO2, and the stack voltage V, any other parameters may be used.

In the above-described embodiment, the fuel supply amount to the catalyst combustor 32 is adjusted on the basis of the excess air ratio $\lambda$ determined such that the anode pole of the fuel cell stack 10 is not included in the oxidative degradation region D. However, the air supply amount to the catalyst combustor 32 may be adjusted on the basis of a predetermined excess air ratio $\lambda$. For example, a desired fuel supply amount to the catalyst combustor 32 may be configured to supply the air to the catalyst combustor 32 by the amount determined corresponding to this fuel supply amount.

Furthermore, while the excess air ratio $\lambda \leq 1$ is mainly assumed in the above-described embodiments, the excess air ratio $\lambda > 1$ may be employed in a range where the oxidative degradation in the anode pole of the fuel cell stack 10 can be reduced.

The upper limit threshold value Pth(T) of the anode oxygen partial pressure PaO2 configured to determine the appropriate excess air ratio $\lambda$ in the above-described second embodiment may be configured to have a value different from the upper limit threshold value Pth(T) used for the determination (see Step S300 in FIG. 9 and FIG. 14) of whether or not the other anode degradation reduction process, such as the reverse voltage application process described in the third embodiment or the additional fuel supply mode described in the fourth embodiment, is to be executed. For example, the upper limit threshold value Pth(T) of the anode oxygen partial pressure PaO2 configured to determine the appropriate excess air ratio $\lambda$ may be configured to be lower than the upper limit threshold value Pth(T) used for the determination of whether or not the other anode degradation reduction process is to be executed, thus executing the combustion gas replacement process on the more safety side from the aspect of preventing the oxidative degradation of the anode pole. This ensures decreasing frequency of executing the other anode degradation reduction process as much as possible.

The above-described embodiments each can be conveniently combined.

The present application claims a priority of Japanese Patent Application No. 2015-254211 filed with the Japan Patent Office on Dec. 25, 2015, and all the contents of which are hereby incorporated by reference.

The invention claimed is:

1. A fuel cell system comprising:
   a fuel cell;
   a combustor configured to combust a fuel and an oxidizing gas to supply a combustion gas to a cathode inlet of the fuel cell;
   a combustion fuel supply device configured to supply a fuel to the combustor;
   a combustion oxidizing gas supply device configured to supply an oxidizing gas to the combustor;

an anode-discharged-gas discharge passage configured to discharge an anode discharged gas from an anode outlet of the fuel cell;

a cathode-discharged-gas discharge passage configured to discharge a cathode discharged gas from a cathode outlet of the fuel cell; and a controller programmed to control a supply of the fuel to the combustor by the combustion fuel supply device and a supply of the oxidizing gas to the combustor by the combustion oxidizing gas supply device, wherein the controller is programmed to:
execute the supply of the fuel and the supply of the oxidizing gas to the combustor as an anode degradation reduction process after a request for stopping the fuel cell system, and perform another anode degradation reduction process in a case where the oxygen partial pressure of an anode pole of the fuel cell becomes equal to or more than a predetermined upper limit threshold value after the request for stopping the fuel cell system and during supply of a fuel and an oxidizing gas, wherein the another anode degradation reduction process comprises at least one of:
a reverse voltage application process for applying an electromotive force reverse to the fuel cell; or
a fuel supply process for supplying fuel to the fuel cell, and the predetermined upper limit threshold value is a value of the oxygen partial pressure for determining whether or not an oxidative degradation of the anode pole occurs during supply of the fuel and the oxidizing gas to the combustor.

2. The fuel cell system according to claim 1, wherein:
the combustor is an activation combustor configured to be supplied with a fuel and an oxidizing gas during a warm-up operation executed at activation of the fuel cell, and combust the fuel and the oxidizing gas to supply a combustion gas to the cathode inlet of the fuel cell, and the controller is programmed to stop a supply of an air to the activation combustor after a termination of the warm-up operation.

3. The fuel cell system according to claim 1, wherein
the controller is programmed to adjust at least any one of a supply amount of a fuel or a supply amount of an oxidizing gas such that an excess ratio of an oxidizing gas to a fuel has a predetermined value for suppressing an oxidative degradation of an anode pole of the fuel cell.

4. The fuel cell system according to claim 3, wherein the predetermined value is one.

5. The fuel cell system according to claim 2, wherein
the controller further is programmed to operate an oxygen partial pressure of the anode pole of the fuel cell, and
the controller is programmed to adjust a supply amount of a fuel on the basis of the oxygen partial pressure of the anode pole.

6. The fuel cell system according to claim 5, wherein
the controller is programmed to adjust a supply amount of a fuel such that the oxygen partial pressure of the anode pole becomes less than a predetermined upper limit threshold value.

7. The fuel cell system according to claim 6, wherein
the upper limit threshold value is determined corresponding to a temperature of the fuel cell.

8. The fuel cell system according to claim 5, wherein
the controller is programmed to operate the oxygen partial pressure of the anode pole on the basis of the temperature of the fuel cell, an oxygen partial pressure of a cathode pole of the fuel cell, and an inter-terminal voltage of the fuel cell.

9. The fuel cell system according to claim 1, wherein
the anode degradation reduction process includes a reverse voltage application process configured to apply an electromotive force reverse to the fuel cell to the fuel cell.

10. The fuel cell system according to claim 1, wherein
the anode degradation reduction process includes a fuel cell fuel supply process configured to supply a fuel to the fuel cell.

11. The fuel cell system according to claim 1, wherein
the controller is programmed to adjust a supply amount of a fuel such that a heat generation amount of combustion by the combustor becomes equal to or less than a heat dissipation of the fuel cell.

12. The fuel cell system according to claim 11, wherein
the controller is programmed to control a supply flow rate of an oxidizing gas to the fuel cell to a lowest flow rate.

13. The fuel cell system according to claim 11, further comprising:
a fuel cell temperature obtaining sensor configured to obtain a temperature of the fuel cell; and
an outside air temperature obtaining sensor configured to obtain an outside air temperature, wherein
the controller is programmed to calculate the heat dissipation of the fuel cell on the basis of the temperature of the fuel cell and the outside air temperature.

14. The fuel cell system according to claim 1, wherein
the combustor is arranged on an oxidizing gas supply passage configured to supply an oxidizing gas to the cathode inlet of the fuel cell.

15. A fuel cell system comprising:
a fuel cell;
a combustor configured to combust a fuel and an oxidizing gas to supply a combustion gas to a cathode inlet of the fuel cell;
a combustion fuel supply device configured to supply a fuel to the combustor;
a combustion oxidizing gas supply device configured to supply an oxidizing gas to the combustor;
an anode-discharged-gas discharge passage configured to discharge an anode discharged gas from an anode outlet of the fuel cell;
a cathode-discharged-gas discharge passage configured to discharge a cathode discharged gas from a cathode outlet of the fuel cell; and
a controller programmed to control a supply of the fuel to the combustor by the combustion fuel supply device and a supply of the oxidizing gas to the combustor by the combustion oxidizing gas supply device, wherein
the controller is programmed to:
execute a system stop process according to a system stop request;
in the system stop process;
perform a first anode degradation reduction process, comprising adjusting an excess ratio of an oxidizing gas to a fuel to be supplied to the combustor such that an oxygen partial pressure of an anode pole of the fuel cell becomes less than a predetermined upper limit threshold value; and
perform a second anode degradation reduction process when the oxygen partial pressure becomes larger than the predetermined upper limit threshold value even though the first anode degradation reduction process is performed, wherein the second anode degradation reduction process comprises at least one of:
- a reverse voltage application process for applying an electromotive force reverse to the fuel cell; or
- a fuel supply process for supplying fuel to the fuel cell, and the predetermined upper limit threshold value is a value of the oxygen partial pressure for determining whether or not an oxidative degradation of the anode pole occurs during supply of the fuel and the oxidizing gas to the combustor, being determined corresponding to a temperature of the fuel cell.

16. The fuel cell system according to claim 15, wherein the controller is programmed to:
- determine whether or not the temperature of the fuel cell is higher than a stop process termination temperature;
- when the temperature of the fuel cell is higher than the stop process termination temperature, continue the first anode degradation reduction process without performing the second anode degradation reduction process under condition that the oxygen partial pressure is less than the predetermined upper limit threshold value, and
- perform the second anode degradation reduction process under condition that the oxygen partial pressure is equal to or larger than the predetermined upper limit threshold value; and
- when the temperature of the fuel cell is not higher than the stop process termination temperature, terminate the system stop process.

17. The fuel cell system according to claim 15, wherein the predetermined upper limit threshold value is determined as being higher as the temperature of the fuel cell becomes lower.

18. The fuel cell system according to claim 16, wherein the predetermined upper limit threshold value is determined as being higher as the temperature of the fuel cell becomes lower.

* * * * *